United States Patent
Taghipour

(10) Patent No.: US 11,154,836 B2
(45) Date of Patent: *Oct. 26, 2021

(54) METHODS AND APPARATUS FOR CONTROLLING RADIATION DOSE TO FLUIDS IN UV-LED PHOTOREACTORS

(71) Applicant: THE UNIVERSITY OF BRITISH COLUMBIA, Vancouver (CA)

(72) Inventor: Fariborz Taghipour, Burnaby (CA)

(73) Assignee: THE UNIVERSITY OF BRITISH COLUMBIA, Vancouver (CA)

( * ) Notice: Subject to any disclaimer, the term of this patent is extended or adjusted under 35 U.S.C. 154(b) by 65 days.

This patent is subject to a terminal disclaimer.

(21) Appl. No.: 16/071,471

(22) PCT Filed: Jan. 19, 2017

(86) PCT No.: PCT/CA2017/050060
§ 371 (c)(1),
(2) Date: Jul. 19, 2018

(87) PCT Pub. No.: WO2017/124190
PCT Pub. Date: Jul. 27, 2017

(65) Prior Publication Data
US 2019/0030510 A1    Jan. 31, 2019

Related U.S. Application Data

(60) Provisional application No. 62/280,637, filed on Jan. 19, 2016.

(51) Int. Cl.
| | | |
|---|---|---|
| *B01J 19/12* | (2006.01) | |
| *C02F 1/32* | (2006.01) | |
| *C02F 103/02* | (2006.01) | |

(52) U.S. Cl.
CPC ............ *B01J 19/123* (2013.01); *C02F 1/325* (2013.01); *B01J 2219/00763* (2013.01);
(Continued)

(58) Field of Classification Search
CPC ............ B01J 19/123; B01J 2219/00763; B01J 2219/00768; B01J 2219/0801;
(Continued)

(56) References Cited

U.S. PATENT DOCUMENTS

| | | | |
|---|---|---|---|
| 5,288,461 A | 2/1994 | Gray | |
| 9,540,252 B1* | 1/2017 | Collins | ................... C02F 1/325 |

(Continued)

FOREIGN PATENT DOCUMENTS

| | | |
|---|---|---|
| WO | 2006134567 A1 | 12/2006 |
| WO | 2007029244 | 3/2007 |
| WO | 2014115146 | 7/2014 |

OTHER PUBLICATIONS

Supplemental European Search Report received in European Patent Application No. 17740937, dated Aug. 27, 2019.
(Continued)

*Primary Examiner* — Xiuyu Tai
(74) *Attorney, Agent, or Firm* — Kilpatrick Townsend & Stockton LLP

(57) ABSTRACT

A reactor that operates with ultraviolet light emitting diodes (UV-LEDs) to attain UV photoreactions or UV photo-initiated reaction in a fluid flow for various applications, including water purification. The UV-LED reactor is comprised of a conduit means for passing fluid flow, an ultraviolet light emitting diode (UV-LED), and a radiation-focusing element to focus the UV-LED radiation to the fluid in the longitudinal direction of the conduit proportionally to the fluid velocity in the cross section of the conduit.

33 Claims, 18 Drawing Sheets

(52) U.S. Cl.
CPC .......... *B01J 2219/00768* (2013.01); *B01J 2219/0801* (2013.01); *B01J 2219/0877* (2013.01); *B01J 2219/0892* (2013.01); *C02F 2103/026* (2013.01); *C02F 2201/326* (2013.01); *C02F 2201/3222* (2013.01); *C02F 2201/3227* (2013.01); *C02F 2201/3228* (2013.01); *C02F 2307/10* (2013.01)

(58) Field of Classification Search
CPC ....... B01J 2219/0877; B01J 2219/0892; C02F 1/325; C02F 2103/026; C02F 2201/3222; C02F 2201/3227; C02F 2201/3228; C02F 2201/326; C02F 2307/10; C02F 1/725; C02F 1/008; C02F 2201/3223; C02F 2303/04; A61L 2/10; A61L 9/20; A61L 9/205; A61L 2209/14; H01L 33/58; H01L 33/60; G02B 19/00
See application file for complete search history.

(56) References Cited

U.S. PATENT DOCUMENTS

| | | |
|---|---|---|
| 2015/0114912 A1 | 4/2015 | Taghipour |
| 2015/0336810 A1 | 11/2015 | Smetona |
| 2019/0062180 A1 | 2/2019 | Taghipour |

OTHER PUBLICATIONS

Taghipour, Fariborz, 'Modeling and Design of Ultraviolet Reactors for Disinfection by-Product Precursor Removal', Desalination, 176, 2005, pp. 71-80.

Office Action received in Chinese Patent Application No. 201780018308.0, dated Jun. 28, 2020.

Elyasi, Siamak, et al., 'Simulation of UV photoreactor for water disinfection in Eulerian framework'.

* cited by examiner

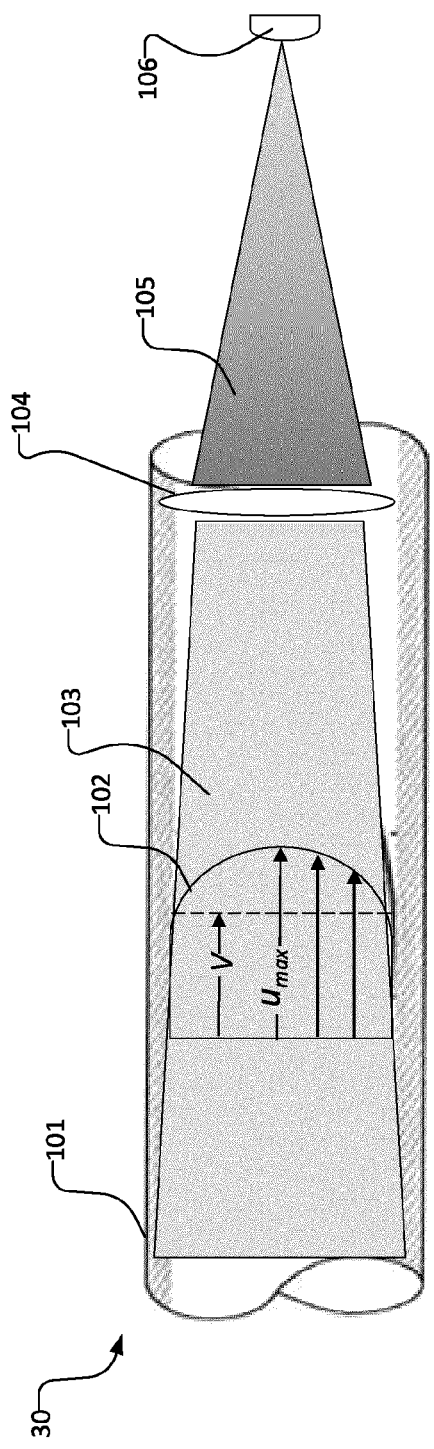
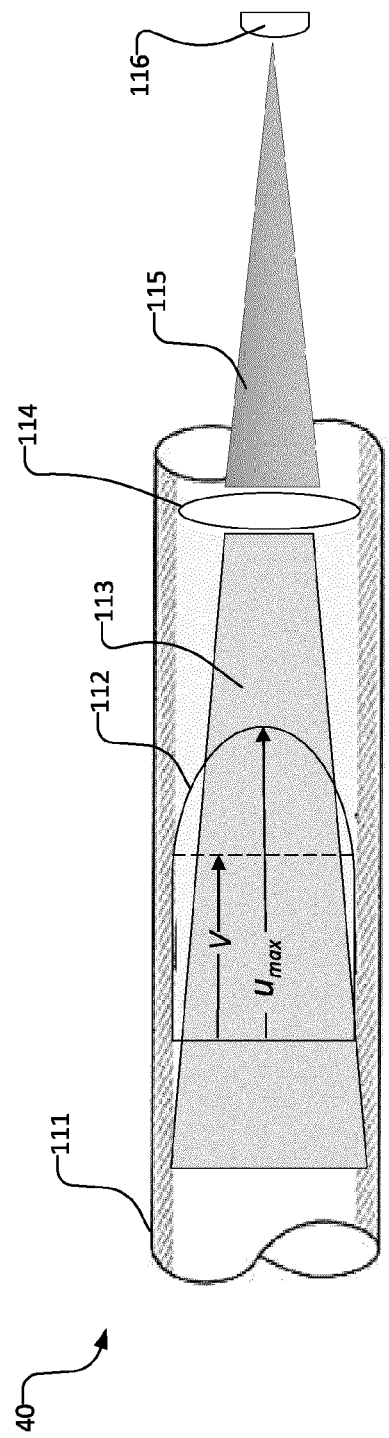
FIGURE 2A
FIGURE 2B

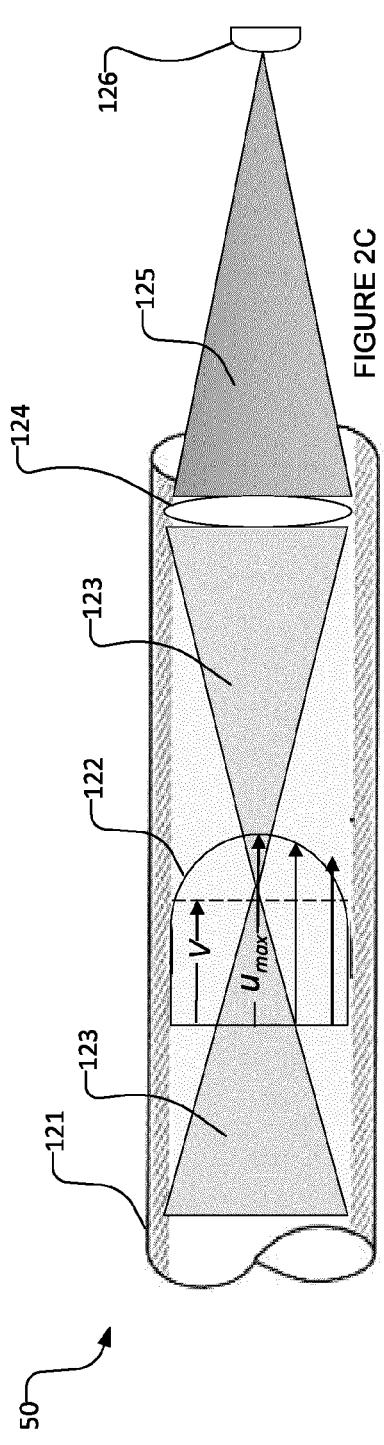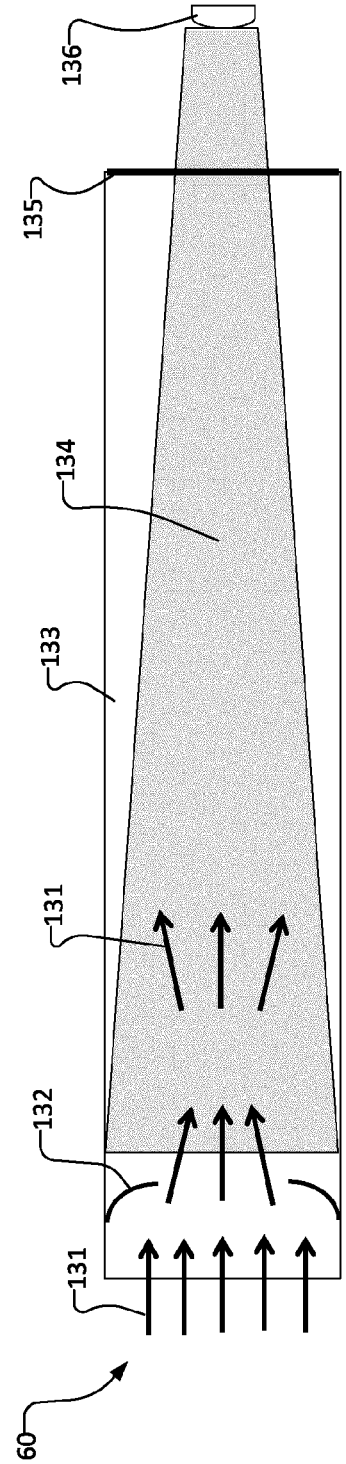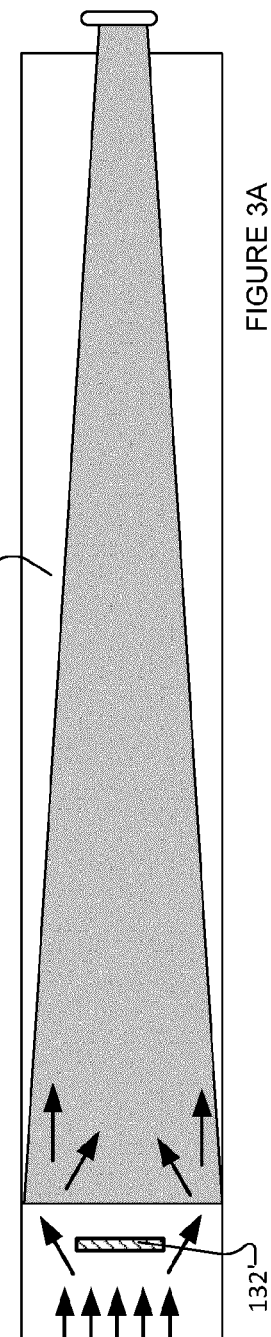

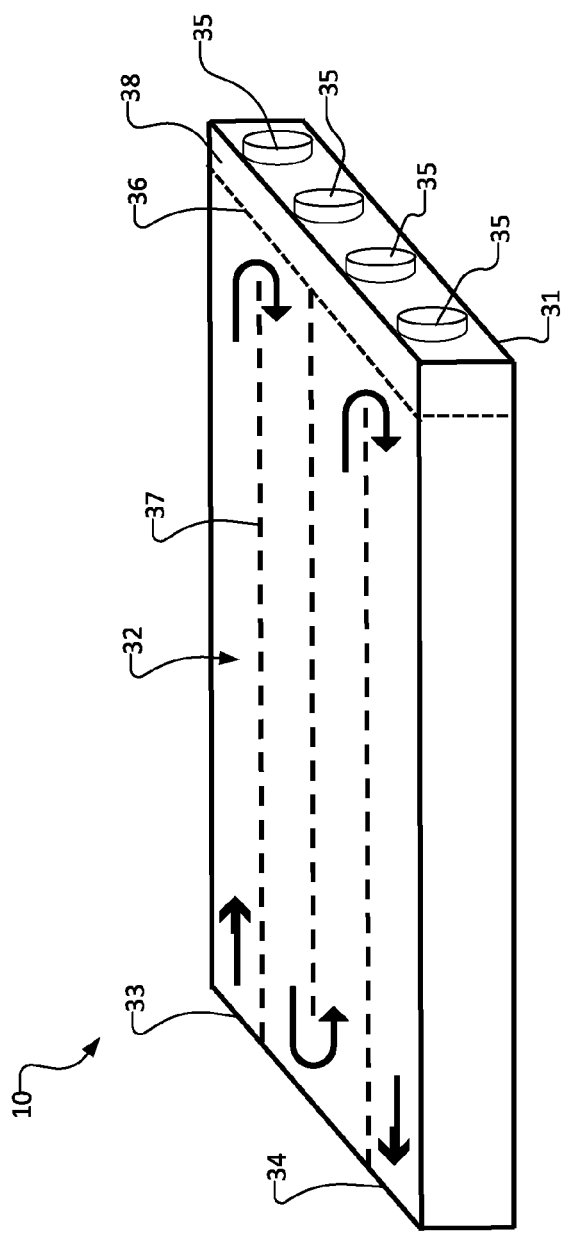

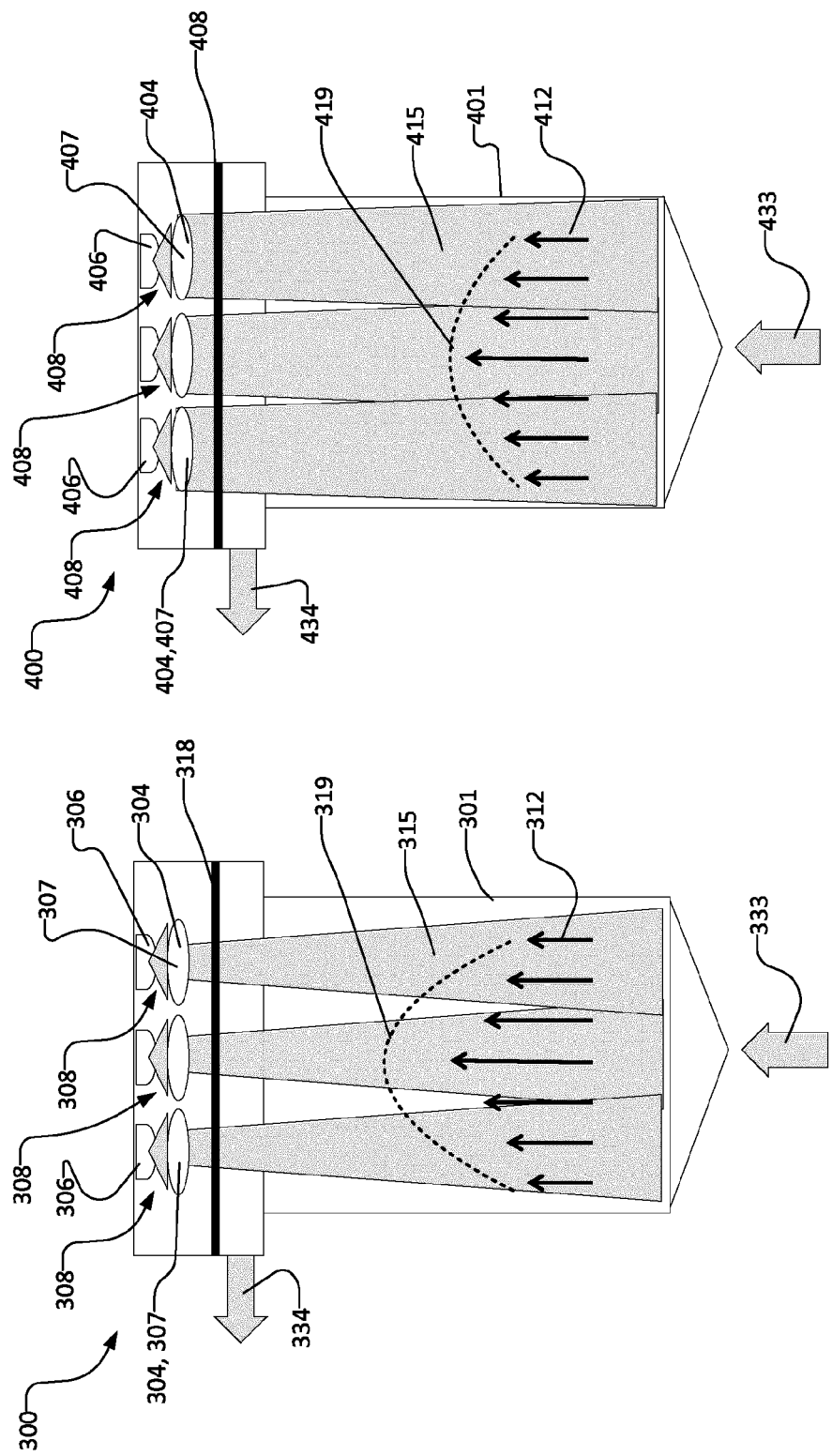

METHODS AND APPARATUS FOR CONTROLLING RADIATION DOSE TO FLUIDS IN UV-LED PHOTOREACTORS

REFERENCE TO RELATED APPLICATIONS

This application is a national stage of PCT/CA2017/050060 filed on 19 Jan. 2017, and claims priority from U.S. Application No. 62/280,637 filed on 19 Jan. 2016 and entitled METHODS AND APPARATUS FOR CONTROLLING RADIATION DOSE TO FLUIDS IN UV-LED PHOTOREACTORS. For purposes of the United States, this application claims the benefit under 35 U.S.C. § 119 of U.S. Application No. 62/280,637 filed on 19 Jan. 2016 and entitled METHODS AND APPARATUS FOR CONTROLLING RADIATION DOSE TO FLUIDS IN UV-LED PHOTOREACTORS. U.S. Application No. 62/280,637 is hereby incorporated herein by reference for all purposes.

TECHNICAL FIELD

The present invention relates to ultraviolet (UV) photoreactors, and more particularly, to a UV reactor operating with ultraviolet light emitting diodes (UV-LEDs). Particular embodiments provide methods and apparatus for controlling the delivery of radiation dose to fluids moving through UV-LED photoreactors.

BACKGROUND

Ultraviolet (UV) reactors—reactors that administer UV radiation—are applied to many photoreactions, photocatalytic reactions, and photo-initiated reactions. One application for UV reactors is for water and air purification. In particular, UV reactors have emerged in recent years as one of the most promising technologies for water treatment. Prior art UV reactor systems typically use low- and medium-pressure mercury lamps to generate UV radiation.

Light emitting diodes (LEDs) typically emit radiation of such narrow bandwidth that radiation emitted by LEDs may be considered (for many applications) to be monochromatic (i.e. of a single wavelength). With recent advances in LED technology, LEDs may be designed to generate UV radiation at different wavelengths, which include wavelengths for DNA absorption as well as wavelengths that can be used for photocatalyst activation.

UV-LED reactors may generally be used for irradiating fluids, with applications such as water disinfection. However, in a typical UV-LED reactor, there is considerable variation of the radiant power distribution, resulting in uneven radiant fluence rate distribution, which may be quite significant in some cases. Fluence rate (in $W/m^2$) is the the radiant flux (power) passing from all directions through an infinitesimally small sphere of cross-sectional area dA, divided by dA. Further, there is typically variation in the fluid velocity distribution, causing a residence time distribution of fluid in the reactor. Either of these two phenomena of fluence rate distribution and velocity distribution, or a combination of these two phenomena, may result in a considerably wide range of UV dose distribution of fluid elements, as it passes through the reactor. The variation in UV fluence rate distribution and velocity distribution (the velocity distribution being related to residence time distribution) may cause part of the fluid to traverse a UV reactor without receiving sufficient UV dose (a product of UV fluence rate and residence time), which is a known issue in the field of UV reactors and may be referred to as "short-circuiting". Short-circuiting can have a significantly unfavorable impact on the performance of a UV reactor.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a UV-LED reactor with precise control of both the fluidic and optical environments. The UV-LED reactor may advantageously provide high and uniform radiation exposure to a fluid flow at a small footprint, and may advantageously provide for a more efficient and compact UV-LED reactor than at least some prior art reactors. The UV-LED reactor may be incorporated into devices for various UV photoreaction applications, including, for example, UV-based water treatment and/or the like (as explained in further detail below).

One aspect of the present invention provides an ultraviolet (UV) reactor comprising a fluid conduit for transporting fluid flow; a solid-state UV emitter (e.g. ultraviolet light emitting diode or UV-LED); and a radiation-focusing element comprising one or more lenses. The fluid conduit may comprise a fluid inlet and a fluid outlet and a longitudinally extending fluid flow channel located between the inlet and the outlet, the fluid flow channel extending in a longitudinal direction for permitting a flow of fluid in a longitudinal direction therethrough. The one or more lenses may be positioned in a radiation path of radiation emitted from the solid-state UV emitter for directing radiation from the solid-state UV emitter to impinge on the fluid flowing in the fluid flow channel. The one or more lenses may be configured to provide an average, over a longitudinal dimension of the fluid flow channel, radiation fluence rate profile over a portion of a cross-section of a bore of the fluid flow channel which is positively correlated with an average, over the longitudinal dimension of the fluid flow channel, longitudinal direction fluid velocity profile over the portion of the cross-section of the bore of the fluid flow channel. The one or more lenses may be configured, by one or more of selection of the one or more lenses from among a variety of lens types, shape of the one or more lenses, position of the one or more lenses and indices of refraction of the one or more lenses, to provide the average, over the longitudinal dimension, radiation fluence rate profile over the portion of the cross-section which is positively correlated with the average, over the longitudinal dimension, longitudinal direction fluid velocity profile over the portion of the cross-section.

The radiation-focusing element may comprise a focusing lens or a combination of two or more focusing lenses disposed proximate to the solid-state UV emitter. The focusing lens(es) may comprise a converging lens, a diverging lens, a collimating lens, or any combination of a collimating lens, a converging lens, a diverging lens or any other type of lens. In some embodiments, the focusing lenses may comprise a converging lens optically adjacent to the UV emitter and a collimating lens at some suitable distance away from the converging lens.

For example, at any cross-sectional location within the portion of the cross-section of the bore of the fluid flow channel, embodiments of the technology provide an average, over the longitudinal dimension, radiation fluence rate which may be higher where the average, over the longitudinal dimension, longitudinal direction fluid velocity is higher, and lower where the average longitudinal direction fluid velocity is lower—i.e. a positive correlation between the average radiation fluence rate and the average longitudinal direction velocity. For example, at any location within the portion of the cross-section of the bore of the fluid flow channel, embodiments of the technology provide an average, over the longitudinal dimension, radiation fluence rate which may be relatively high at the center of the bore of the fluid flow channel, where the average, over the longitudinal dimension, longitudinal direction fluid velocity may be higher, and relatively low near the edges of the bore of the fluid flow channel or at other locations spaced apart from the center of the cross-section, where the average, over the longitudinal dimension, longitudinal direction fluid velocity may be lower. In general, the positive correlation between the average radiation fluence rate and the average longitudinal direction velocity is not limited to situations where the average longitudinal direction velocity is higher at the center of the cross-section and suitable configuration of lens(es) may be used to establish this positive correlation for other average longitudinal direction velocity cross-sectional profiles. In some embodiments, it may be desirable for this positive correlation between the average radiation fluence rate and the average longitudinal direction fluid velocity within the portion of the cross-section of the bore of the fluid flow conduit to be a general proportionality of the average radiation fluence rate to the average longitudinal direction fluid velocity. In some embodiments, this proportionality of the average radiation fluence rate to the average longitudinal direction fluid velocity within the portion of the cross-section of the bore of the fluid flow channel need not be an exact proportionality, but instead may be proportional in a manner which has a proportionality constant that varies less than +/−50% over the portion of the cross-section. In some embodiments, this proportionality constant varies less than +/−25%. In some embodiments, this proportionality constant varies less than +/−15%. In some embodiments, this proportionality constant varies less than +/−10%. The portion of the cross-section of the bore of the fluid flow channel over which the aforementioned proportionality exists may be greater than 50% of the total cross-sectional area of the bore of the fluid flow channel in some embodiments, may be greater than 75% of the total cross-sectional area of the bore of the fluid flow channel in some embodiments, and may be greater than 85% of the total cross-sectional area of the bore of the fluid flow channel in some embodiments.

Further, for any specific radiation fluence rate profile within a portion of a cross-section of a bore of the longitudinally extending fluid flow channel, one or more flow-restraining elements may be deployed in the fluid flow channel to restrain the fluid flow in the bore of the longitudinally extending fluid flow channel and may be shaped and/or positions for providing the average (over the longitudinal dimension) longitudinal direction velocity profile over the portion of the cross-section of the bore of the longitudinally extending fluid flow channel which is positively correlated with an average (over the longitudinal dimension) radiation fluence rate profile over the portion of the cross-section of the bore of the longitudinally extending fluid flow channel.

For example, for a particular case where the average radiation fluence rate is relatively high at a center of the cross-section of the bore of the fluid flow channel, a ring baffle having an aperture at the center can be deployed with the aperture at the cross-sectional center of the bore to provide relatively high average longitudinal direction velocity at the center of the cross-section of the bore of the fluid flow channel, where the average radiation fluence rate is higher, and relatively low average longitudinal direction velocity near the edges of the cross-section of the bore of the fluid flow channel, where the average radiation fluence rate is lower. The baffle shape and/or position can be adjusted to provide an average longitudinal direction velocity distribution that is positively correlated with the average radiation fluence rate distribution over a portion of the cross-section of the bore of the fluid flow channel (in which the aforementioned proportionality exists). In some embodiments, it may be desirable for this positive correlation between the average longitudinal direction fluid velocity and the average radiation fluence rate within the portion of the cross-section of the bore of the fluid flow conduit to be a general proportionality of the average longitudinal direction fluid velocity to the average radiation fluence rate. In some embodiments, this proportionality of the average longitudinal direction fluid velocity to the average radiation fluence rate within the portion of the cross-section of the bore of the fluid flow channel need not be an exact proportionality, but instead may be proportional in a manner which has a proportionality constant that varies less than +/−50% over the portion of the cross-section. In some embodiments, this proportionality constant varies less than +/−25%. In some embodiments, this proportionality constant varies less than +/−15%. In some embodiments, this proportionality constant varies less than +/−10%. The portion of the cross-section of the bore of the fluid flow channel over which the aforementioned proportionality exists may be greater than 50% of the total cross-sectional area of the bore of the fluid flow channel in some embodiments, may be greater than 75% of the total cross-sectional area of the bore of the fluid flow channel in some embodiments, and may be greater than 85% of the total cross-sectional area of the bore of the fluid flow channel in some embodiments.

The baffle (or other flow-restraining element(s)) may be static. The baffle (or other flow-restraining element(s)) may also be adjusted dynamically to accommodate various incoming flow regimes to match the UV radiation fluence rate profile in the fluid flow channel. For example, a baffle's angle relative to the longitudinal direction of the fluid flow may be changed by rotating it around a pivot; or its longitudinal and/or transverse dimension(s) can be adjusted by sliding suitable adjustment of extendable portion(s) of the baffle.

In some embodiments, the reactor may comprise an array of longitudinally extending fluid flow channels, any number of which may comprise properties similar to the longitudinally extending fluid flow channel described herein. In some embodiments, each such fluid flow channel can be irradiated by one or more corresponding solid state UV emitters through a corresponding radiation-focusing element. The corresponding solid state UV emitters and/or the corresponding radiation-focusing elements may be positioned at longitudinal ends of their corresponding longitudinally-extending fluid flow channels so that a direction of irradiation is generally parallel to, (and in the direction of and/or opposing the direction of) the fluid flow (i.e. in longitudinal directions). The reactor may comprise a plurality of UV-LEDs that emit different UV wavelengths. The reactor may comprise a photocatalyst supported on a structure in the reactor. The reactor may comprise a chemical reagent that is added to the reactor. The UV-LED may be turned on and off automatically by an external signal. The reactor may contain one or more components to restrain the fluid flow in the conduit, such as static mixers, vortex generators, baffles and/or the like.

In another aspect, the present invention provides a method of attaining UV photo reaction or UV photo-initiated reaction in a fluid flow through a conduit comprising a fluid inlet and a fluid outlet and a longitudinally extending fluid flow channel located between the inlet and the outlet, the fluid flow channel extending in a longitudinal direction for permitting a flow of fluid in a longitudinal direction therethrough. This is accomplished by causing the fluid flow in the longitudinal direction through the longitudinally extending fluid flow channel; positioning a radiation-focusing element comprising one or more lenses in a radiation path of at least one solid-state UV emitter; and positioning the one or more lenses such that the focused radiation from the solid state UV emitter is directed to impinge (e.g. in the longitudinal direction) on the longitudinally flowing fluid in the longitudinally extending fluid flow channel. The method may comprise configuring the one or more lenses to provide an average, over a longitudinal dimension of the fluid flow channel, radiation fluence rate profile over a portion of a cross-section of a bore of the fluid flow channel which is positively correlated with an average, over the longitudinal dimension of the fluid flow channel, longitudinal direction fluid velocity profile over the portion of the cross-section of the bore of the fluid flow channel. Configuring the one or more lenses may comprise selecting the one or more lenses from among a plurality of lens types, shaping the one or more lenses, positioning the one or more lenses and fabricating the one or more lenses from materials having indices of refraction. In some embodiments, it may be desirable for this positive correlation between the average radiation fluence rate and the average longitudinal direction fluid velocity within the portion of the cross-section of the bore of the fluid flow conduit to be a general proportionality of the average radiation fluence rate to the average longitudinal direction fluid velocity. The relationship between the average radiation fluence rate profile and the average longitudinal direction fluid velocity profile within the portion of the cross-section of the bore of the fluid flow channel over which the aforementioned proportionality exists may have any of the properties described above or elsewhere herein. A photocatalyst may be used to promote photocatalytic reactions in the fluid. A UV-reactive chemical reagent may be used to promote photo-initiated reactions.

In yet another aspect, the present invention provides a method for the treatment of a fluid, such as water or air, the fluid flowing through a conduit comprising a fluid inlet and a fluid outlet and a longitudinally extending fluid flow channel located between the inlet and the outlet, the fluid flow channel extending in a longitudinal direction for permitting a flow of the fluid therethrough in the longitudinal direction. This is accomplished by causing the fluid flow in the longitudinal direction through the longitudinally extending fluid flow channel; positioning a radiation-focusing element in a radiation path of at least one UV light emitting diode (UV-LED); and configuring (e.g. selecting, shaping, positioning, fabricating from materials with suitable index of refraction and/or the like) the radiation-focusing element such that focused radiation from the UV-LED is directed to impinge (e.g. in the longitudinal direction) on the longitudinally flowing fluid in the longitudinally extending fluid flow channel. The radiation-focusing element may comprise one or more lenses which may be configured (e.g. selected, positioned, shaped, fabricated from materials with suitable index of refraction and/or the like) for providing an average (over a longitudinal dimension of the longitudinally extending fluid flow channel) radiation fluence rate profile within a portion of a cross-section of a bore of the longitudinally extending fluid flow channel which is positively correlated with the average (over the longitudinal dimension of the longitudinally extending fluid flow channel) longitudinal direction fluid velocity profile within the portion of the cross-section of the bore of the longitudinally extending fluid flow channel. In some embodiments, it may be desirable for this positive correlation between the average radiation fluence rate and the average longitudinal direction fluid velocity within the portion of the cross-section of the bore of the fluid flow conduit to be a general proportionality of the average radiation fluence rate to the average longitudinal direction fluid velocity. The relationship between the average radiation fluence rate profile and the average longitudinal direction fluid velocity profile within the portion of the cross-section of the bore of the fluid flow channel over which the aforementioned proportionality exists may have any of the properties described above or elsewhere herein. The microbial and chemical contaminants in the fluid flow may be inactivated and/or eliminated while the ultraviolet radiation is emitted into the fluid flow.

The efficiency of a UV reactor may be determined by the total UV fluence, which is the radiant exposure delivered to a fluid in the reactor. The UV fluence is the product of the UV fluence rate, which comprises, or is related to, the incident radiant power (as the integral of the radiant power passing from all directions through an infinitesimally small sphere of cross-sectional area dA divided by dA), and the exposure time. The fluence rate in a UV reactor may be controlled by adjusting the UV-LED radiant power profile in the reactor, while the exposure time may be controlled by adjusting the reactor hydrodynamics of the fluid moving through the reactor. The UV-LED reactor of some embodiments of the present invention provides high reactor performance through its precise control of both the radiant power profile and the hydrodynamics of the fluid moving through the reactor. Further, the UV-LED reactor of some embodiments of the present invention may improve efficiency by increasing uniformity in UV dose (fluence) distribution to the fluid being treated in the reactor and by delivering the majority of UV radiation directly to the fluid, instead of losing the UV radiant energy to the reactor wall(s).

In one variation, an aspect of the present invention provides a reactor operating with one or more ultraviolet light emitting diodes (UV-LEDs) to cause photoreactions or photo-initiated reactions in a fluid. The UV-LED reactor comprises a single or series of longitudinally extending flow channels (conduit, tube) through which fluid flows in corresponding longitudinal direction(s), which is irradiated, either with one UV-LED, or with an array of UV-LEDs. The reactor may comprise a single longitudinally extending fluid flow channel, a series of parallel fluid flow channels, or a stack of multiple fluid flow channels. In a multi-channel reactor, the fluid flow may go through the channels in parallel or in series (fluid flow going from one channel to another, where the flow channels are in fluid communication at their ends). The fluid may flow mainly in the longitudinal direction of the longitudinally extending channels. The UV-LED radiation is focused via a radiation-focusing element, such as one or more converging lenses, one or more collimating lenses, or a combination of one or more converging lenses and one or more collimating lenses. In some embodiments, the focusing element may comprise a converging lens optically adjacent to the UV emitter and a collimating lens at some suitable distance away from the converging lens. The fluid flowing in the longitudinal directions in the reactor channels is irradiated by the focused radiation from the UV-LEDs in the longitudinal directions of the channels. The LEDs may be positioned at one or both ends of the flow channels. The total UV dose (UV fluence) delivered to a fluid may be controlled by adjusting the fluid flow rate and/or regulating UV-LED radiant power, and/or turning on/off the number of UV-LEDs. The reactor configuration according to some embodiments of the present invention facilitates the design and fabrication of an efficient and compact UV reactor with all-integrated components.

In some embodiments of the present invention, the radiation-focusing element comprises one or more focusing lenses, such as one or more collimating lenses or one or more converging lenses, disposed proximate to the UV-LED. Each lens may be either a stand-alone lens or a lens integrated into the UV-LED device. The lens may be made of quartz or another UV transparent material. A combination of one or more collimating lenses and one or more converging lenses may be used in some embodiments. The radiation-focusing element may be adjusted to provide higher fluence rate at the center of the bore of the longitudinally extending flow channel, where the fluid typically has a higher velocity (and lower residence time) and lower fluence rate near the channel wall (the edges of the bore), where the fluid typically has a lower velocity (and higher residence time). As a result, by the time that the fluid leaves the reactor or the longitudinally extending fluid flow channel, each component of the fluid has received similar or comparable UV dose. In practice, one way that this could be achieved is using one or more focusing lenses as the radiation-focusing element (for example a converging lens or a combination of a converging lens and a collimating lens that is not necessarily positioned in its focal length distance with respect to the radiation source) to focus the radiation fluence rate in the channel based on the velocity profile. This particular configuration of the UV-LED reactor, which involves adjusting the UV-LED radiation in accordance to the velocity profile, may result in a more effective utilization of UV-LED radiant power and improves reactor performance.

To explain the concept of average radiation fluence rate proportional to the average fluid velocity, here we provide a non-limiting example. For a cylindrical fluid flow channel (i.e. having a bore with a circular cross section), the velocity profile of the fluid may be an elliptic paraboloid (a three-dimensional parabolic shape); with a radius r corresponding to the radius R of the channel cross-section. If the length of the longitudinally extending flow channel is 0.2 m and the average (over the longitudinal length of the flow channel) velocity at the center of the cross section of the channel bore (r=0) is 0.2 m/s, the residence time (in the longitudinally extending fluid flow channel) of the fluid that moves at r=0 is 1 s. If we assume that the average velocity at r=0.5R is 0.1 m/s, for example, then the residence time (in the longitudinally extending fluid flow channel) of the fluid that moves at r=0.5R is 2 s. Since UV dose (UV fluence) is a product of residence time (exposure time) multiplied by UV fluence rate, to make both the part of the fluid moving at r=0 and at r=0.5R to receive the same dose, it would be desirable for the radiation fluence rate to be adjusted so that at r=0, the average (over the longitudinal length of the flow channel) radiation fluence rate is approximately twice the value of that at r=0.5R. For instance, if the fluence rate at r=0 is 2 mJ/cm$^2$, its value at r=0.5R is 1 mJ/cm$^2$. This is particularly advantageous where there is minimal cross-sectional (e.g. radial) mixing of the fluid. Adjusting the radiation fluence rate to be exactly proportional to the velocity profile may not always be easily attainable or practical. In some embodiments, it is sufficient for the average longitudinal direction fluid velocity to the average radiation fluence rate to be positively correlated over a suitable portion of the surface area of the cross-section of the bore of the fluid flow channel (or a suitable portion of the volume of the bore of the fluid flow channel). The portion of the cross-section of the bore of the fluid flow channel, for which the positive correlation of velocity and fluence rate exist, may be greater than 50% of the total cross-section of the bore of the fluid flow channel in some embodiments, may be greater than 75% of the total cross-section of the bore of the fluid flow channel in some embodiments and may be greater than 85% of the total cross-section of the bore of the fluid flow channel in some embodiments. The proportionality of the average longitudinal direction fluid velocity to the average radiation fluence rate within the portion of the cross-section of the bore of the fluid flow channel need not be an exact proportionality, but instead may be proportional in a manner which has a proportionality constant that varies less than +/−50% over the portion of the cross-section. In some embodiments, this proportionality constant varies less than +/−25%. In some embodiments, this proportionality constant varies less than +/−15%. In some embodiments, this proportionality constant varies less than +/−10%. In some embodiments, however, tolerance levels within +/−50% of the fluence rate may be suitable. For instance, for the example described above the fluence rate at r=0.5R could be between 0.75 mJ/cm$^2$ and 1.25 mJ/cm$^2$.

To explain the foregoing concepts in an alternate way: if the velocity profile of a fluid in cross-section of the bore of the channel, when averaged over the longitudinal length of the channel, has the shape of an elliptic paraboloid (a quadratic surface which has elliptical cross section), of height h, semi major axis a, and semi minor axis b (a and b will be the same for a circular cross section), the average UV fluence rate (averaged over the length of the longitudinally extending channel) at any cross-section of the bore of the channel will have the same shape of an elliptic paraboloid with the same h, a, and b parameters. Since a perfect match is not likely to be easily attainable or practical, a threshold of +/−50% of the perfect match values may be applied for the fluence rate values. The proportionality of the average longitudinal direction fluid velocity to the average radiation fluence rate within the portion of the cross-section of the bore of the fluid flow channel need not be an exact proportionality, but instead may be proportional to in a manner which has a proportionality constant that varies less than +/−50% over the portion of the cross-section. In some embodiments, this proportionality constant varies less than +/−25%. In some embodiments, this proportionality constant varies less than +/−15%. In some embodiments, this proportionality constant varies less than +/−10%. This proportionality of the average fluence rate and the average velocity may be true over a portion of the cross-section of the bore of the longitudinally extending fluid flow channel. Such portion of the cross-section of the bore of the fluid flow channel may be greater than 50% of the total cross-section of the bore of the fluid flow channel in some embodiments, may be greater than 75% of the total cross-section of the bore of the fluid flow channel in some embodiments and may be greater than 85% of the total cross-section of the bore of the fluid flow channel in some embodiments.

Residence time for fluid (in a reactor or a portion of the reactor) is defined as the time that the fluid spends (inside of the reactor or the portion of the reactor) while being irradiated. Given the velocity profile within any fluid flow conduit, usually each part of the fluid spends a different amount of time in the reactor and, as a result, different parts of the fluid have different residence times in the reactor (there is a residence time distribution that can be averaged to calculate the average residence time). Part of the fluid that travels mainly at the center of a channel typically has a higher velocity and therefore shorter residence time in the channel.

The UV-LED reactor of the present invention may be used for many photoreactions, photocatalytic reactions, and photo-initiated reactions. One particular application is the purification of water or purification of other UV-transparent fluids.

Some aspects of the invention provide UV-LED reactors for treating water and methods for using UV-LED reactors to treat water. These UV-LED reactors and corresponding methods may have features similar to those described above or elsewhere herein. Water treatment may be achieved by the inactivation of microorganisms (e.g., bacteria and viruses) and the degradation of micro-pollutants, such as chemical contaminants (e.g., toxic organic compounds), by direct photoreactions, photocatalytic reactions, and/or photo-initiated oxidation reactions. Water may flow through the UV-LED reactor by the use of a fluid-moving device, such as an electrical pump. The UV-LEDs may be powered by a wall plug or a battery. If applicable, a photocatalyst may be immobilized on a solid substrate, where the fluid passes over, and/or on a perforated substrate where the fluid passes through, including for example a mesh, screen, metal foam, cloth or combination thereof. The photocatalysts that are supported on the solid and/or perforated substrates may be positioned in the longitudinally extending fluid flow channels. The photocatalyst may also be positioned in the cross section of the fluid flow channel, to cover the cross section partially or entirely. If the photocatalyst covers the entire cross section of the flow channel, a perforated substrate may be used to allow for the fluid to pass through the photocatalyst substrate. The photocatalyst is irradiated with focused UV radiation from the UV-LED, providing a UV-LED photocatalytic reactor. The photocatalyst may comprise titanium dioxide $TiO_2$, or any other photocatalyst. In certain embodiments, a combination of one or more photocatalysts, catalyst supports and co-catalysts are provided on the solid and/or perforated substrate(s). If applicable, chemical reagents, such as chemical oxidants may be injected into the UV reactor. The chemical oxidant may comprise hydrogen peroxide $H_2O_2$, ozone $O_3$, or other chemicals.

In some applications of the UV-LED reactor described herein, the UV-LED reactor may be used to treat water in point-of-use applications, particularly in low to moderate flow applications. For example, the UV-LED reactor may be incorporated into appliances that dispense or use water or water-based fluids (e.g. coffee or other beverages) for human consumption. Such appliances may include refrigerators, freezers, ice machines, frozen beverage machines, water coolers, coffee makers, vending machines and the like. Other applications of the UV-LED reactor described herein include the treatment of water used in healthcare-related devices. Such devices may include, for example, hemodialysis machines, colon hydrotherapy equipment, or the like. The UV-LEDs of the reactor which are incorporated into any one of the aforementioned appliances or devices may be turned on and off automatically as the water starts or stops flowing, to treat the water used in or dispensed from the appliances or devices. The UV-LED reactor reduces the microbial contamination in the water leaving the waterline (for consumption or use) and reduces the risk for infection. The UV-LED reactor may be integrated in these devices along with other forms of water purification methods such as filtration and the like.

In some embodiments, static mixers, vortex generators, baffles, or the like may be deployed in the longitudinally extending fluid flow channels to increase mixing and/or to rotate the flow as it goes through the fluid flow channels. This may enhance the UV-LED reactor performance by delivering a more uniform UV dose or by improving mass transfer near the photocatalyst surface where photocatalysts are presents in the reactor. The static mixers, vortex generators, baffles or the like may also serve as flow-restraining elements which may be adjusted dynamically to accommodate various incoming flow regimes to match the UV radiation fluence rate profile in the fluid flow channel as described herein.

In some embodiments, the reactor comprises a plurality of UV-LEDs that emit different UV wavelengths. This may result in a synergistic effect and increase the rate of photoreactions and photocatalytic reactions.

Some embodiments comprise UV-LEDs which are operated in a pulsed mode. For example the LEDs may be pulsed at high frequencies. This mode of operation may affect the photoreaction rate as well as the photocatalyst's electron-hole recombination so as to increase photocatalytic efficiencies.

The UV-LEDs may be programmed to turn on and off automatically in some embodiments. For example it may be desirable to turn on/off the UV-LEDs as the fluid flow starts or stops moving in the reactor (which may be useful for water purification in point-of-use applications), or at specific time intervals. To control the UV-LEDs' on/off status, a sensor may be used to detect the fluid motion in the fluid flow channels. Alternatively, a user may activate a sensor physically, either directly (for example, by turning a switch on and off), or as an indirect action (for example through turning the tap on and off). This feature may advantageously save energy used by the reactor. As another example, it may be desirable to turn on/off the UV-LEDs at specific time intervals for cleaning of the UV reactor chamber when it is not in operation for some time, in order to prevent any potential growth of microorganisms, diffusion of microorganisms from untreated upstream fluid, and/or to prevent any biofilm formation. To control the UV-LEDs' on/off status, a microcontroller may be applied and programmed to turn the UV-LEDs on for a time period (for example, a few seconds), at specific time intervals (for example, once every few hours).

In some embodiments, at least some of the UV-LEDs may be programmed to adjust their power output or to turn on or off automatically, in response to receiving a signal. The signal may be generated, for example, as the flow rate (or other measurable characteristic) of the fluid passing through the UV-LED reactor changes. In embodiments where the fluid is water, the measurable characteristic may be one that is indicative of the water quality or concentration of contaminants. Examples of water quality indicators include UV transmittance and turbidity. This configuration may facilitate appropriate radiation energy being directed to the fluid based on the particular operating conditions.

In some embodiments, a visual indicator, such as for example a liquid crystal display (LCD) or a light signal (such as a colored LED) may be provided on the UV-LED reactor, or in another visible place (for example, on the tap if the application is water treatment) to inform the user of the status of the reactor and UV-LEDs. As an example, when the UV-LEDs are on, a sign on the LCD can be displayed or a colored LED can be turned on which indicates the "on" status of the UV-LEDs to the user.

To increase or maintain the lifespan of the UV-LEDs, the fluid flowing through the fluid flow channels may be used for the thermal management of the UV-LEDs by transferring the heat generated by the LEDs. The UV reactor may be configured so that part of the fluid is circulated in the proximity of the UV-LEDs or the UV-LED circuit board, and/or by incorporating thermally conductive material in the walls of the fluid flow channels.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIGS. 2A and 2B are schematic side views of a portion of the longitudinally extending fluid flow channels of particular configurations of a UV-LED reactor according to example embodiments;

FIG. 2C is a schematic side view of a portion of the longitudinally extending fluid flow channel of a configuration of a UV-LED reactor according to an example embodiment;

FIG. 3 is a schematic side view of a variation of a portion of the longitudinally extending fluid flow channel of a particular configuration of a UV-LED reactor according to an example embodiment;

FIG. 3A is a schematic side view of a variation of a portion of the longitudinally extending fluid flow channel of a particular configuration of a UV-LED reactor according to an example embodiment;

FIG. 4 is a schematic perspective view of a UV-LED reactor according to an example embodiment;

FIGS. 7 and 8 are schematic side views of a portion of a longitudinally extending fluid flow channel of a UV-LED reactor according to a particular embodiment comprising multiple UV-LEDs, each having one or more lenses, irradiating the fluid in the flow channel;

DESCRIPTION

Figure 1A:
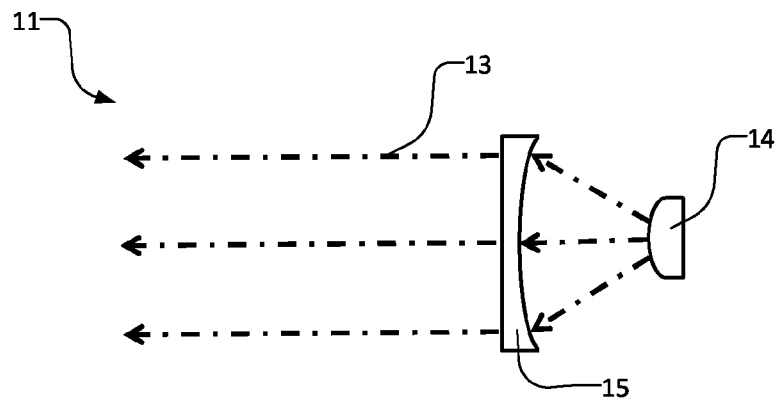
FIG. 1A illustrates UV-LED radiant beams passing through a collimating optical lens.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

The present technology is directed to a reactor (photoreactor) operating with one or more solid-state UV emitters (e.g. ultraviolet light emitting diodes or UV-LEDs, thin dielectric films that emit UV, and the like), which emit UV radiation to cause photoreactions in a fluid. One or more photocatalyst structures, activated by UV, may be used in the photoreactor for photocatalytic reactions. Chemical oxidants may also be added to the reactor to react with the UV radiation and generate highly active radicals such as hydroxyl radicals for photo-initiated oxidation reactions. Embodiments of the UV-LED reactors described herein may be efficient and compact, with integrated components, and may offer precise control of both their fluidic and optical environments. The UV-LED reactors comprise one or more specifically designed flow channels and an array of UV LEDs configured for irradiating the fluid flowing through the flow channels. Radiation-focusing elements may be integrated in or disposed near the UV LEDs and may be configured (e.g. by suitable selection of lens(es) (e.g. from among a plurality of lens types, construction methods and/or the like), positioning (including orientation) of lens(es), shaping (including sizing) of lens(es), fabrication of lens(es) from materials with suitable indices of refraction and/or the like) to focus the UV radiation emitted by the UV LEDs to provide an average (over the longitudinal dimension of the longitudinally extending fluid flow channel) radiation fluence rate profile over a cross-section of a bore of the longitudinally extending fluid flow channel (or a portion thereof) which is positively correlated with an average (over the longitudinal dimension of the longitudinally extending fluid flow channel) longitudinal direction fluid velocity profile within the cross-section of the bore of the longitudinally extending fluid flow channel (or the portion thereof). In some embodiments, this positive correlation may comprise an average (over the longitudinal dimension of the longitudinally extending fluid flow channel) radiation fluence rate profile within the cross-section of the bore of the longitudinally extending fluid flow channel (or the portion thereof) which is generally proportional to an average (over the longitudinal dimension of the longitudinally extending fluid flow channel) longitudinal direction fluid velocity profile within the cross-section of the bore of the longitudinally extending fluid flow channel (or the portion thereof). While these parameters (radiation fluence rate and fluid velocity) may exhibit these features (positive correlation and/or general proportionality) when averaged over a longitudinal dimension of the fluid flow channel, in some embodiments, these parameters (radiation fluence rate and fluid velocity) may exhibit these features (positive correlation and/or general proportionality) at each cross-section over a portion of the longitudinal dimension of the fluid flow channel. The UV-LED reactor may comprise baffles, vortex generators, static mixers, or the like (e.g. other flow-restraining elements), to alter the hydrodynamics of the flow, thereby enhancing the performance of the UV-LED reactor. In particular, the baffles, vortex generators, or static mixers may be adjusted dynamically to accommodate various incoming flow regimes to correlate positively with the UV radiation fluence rate profile in the fluid flow channel.

Embodiments of the UV-LED reactor may be used for water purification by inactivating microorganisms (e.g. bacteria, viruses and/or the like) and/or degrading micro-pollutants such as chemical contaminants (e.g. toxic organic compounds and/or the like) by direct photoreaction, and/or photocatalytic reactions, and/or photo-initiated oxidation. The fluid (e.g., water) flows through the UV-LED reactor by forced convection, using, for example, electrical pumps. The UV-LEDs may be powered by wall plug, solar cells, or battery. The UV-LEDs may be turned on and off automatically as the fluid flows or stop flowing. A photocatalyst such as titanium dioxide $TiO_2$ or other suitable photocatalyst may be immobilized on a solid substrate (where the fluid passes over the substrate) or on a perforated substrate (where the fluid passes through the substrate). In some embodiments, a combination of photocatalysts, catalyst supports, and/or co-catalysts may be disposed in the substrate in the fluid flow channel. If applicable, chemical oxidants may additionally or alternatively be injected into the reactor. The chemical oxidant may comprise hydrogen peroxide $H_2O_2$ or ozone $O_3$ or other chemicals. If applicable, chemical reducing agents may additionally or alternatively be injected into the reactor. The chemical oxidant or chemical reducing agents may be generated in the flow upstream of the UV reactor or inside of the UV reactor by electrochemical methods or other methods.

Reactors that operate with UV-LEDs as a source of UV radiation have advantages over traditional mercury UV lamps, including, without limitation, their compact and robust design, lower voltage and power requirements, and the ability to turn on and off with high frequency. Unlike UV lamps, UV-LEDs are radiation sources with individual, small sizes. They may be positioned in a reactor with a higher degree of freedom (e.g. greater precision) compared to the arrangement of UV lamps. Further, the performance of UV-LED reactors may be improved with optimizations to the reactor geometry, the reactor hydrodynamics, and UV radiation distribution as described herein. In particular, embodiments of the UV-LED reactor described herein may be optimized based on a combination of UV-LED radiation patterns and the flow field hydrodynamics, thereby facilitating improved UV dose delivery to the fluid.

Figure 1B:
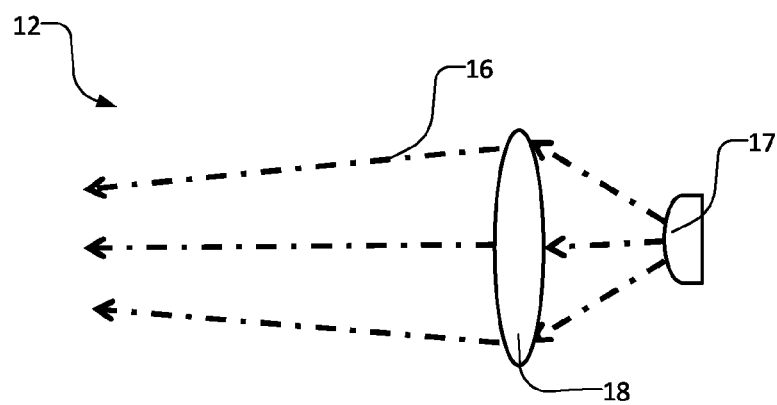
FIG. 1B illustrates UV-LED radiant beams passing through a converging optical lens.

FIGS. 1A and 1B are schematic side views of UV-LED collimated radiation 11 (FIG. 1A) and converged radiation 12 (FIG. 1B). FIG. 1A shows radiant beams 13 emitted from an LED 14 after passing through a collimating lens 15. FIG. 1B shows radiant beams 16 emitted from an LED 17 after passing through a converging lens 18. The arrows shown in FIGS. 1A and 1B indicate the main direction of the radiant beams.

FIGS. 2A and 2B show partial side views of longitudinally extending fluid flow channels of two corresponding UV-LED reactor configurations according to exemplary embodiments. FIGS. 2A and 2B show the illustrated flow channels being irradiated from one of their longitudinal ends. In general, the channels of UV-LED reactors in which the longitudinally extending channels of FIGS. 2A-2B are deployed may be irradiated from either or both longitudinal ends of the fluid flow channel. In general, UV-LED reactors in which the longitudinally extending channels of FIGS. 2A-2B are deployed may comprise single channel reactors (i.e. having a single channel similar to that shown in FIGS. 2A-2B) or multiple channel reactors having a plurality of longitudinally extending channels similar to the longitudinally extending channels of the FIG. 2A or 2B reactors. The inlet and outlet orientations and their fluid flow directions may be different for a multi-channel reactor compared to those for a single-channel reactor. The straight arrows shown in FIGS. 2A and 2B indicate the main direction of the fluid flow which is in the same longitudinal direction in which the fluid flow channel extends.

FIG. 2A shows the side view of a portion of a UV-LED reactor 30 having a longitudinally extending fluid flow channel 101, and a UV-LED 106, in which the fluid (not shown) is moving with a longitudinal direction velocity profile 102 which varies across the cross-section of the bore of the fluid flow channel 101. In particular, the fluid in the FIG. 2A embodiment has a maximum velocity ($u_{max}$) at or near the center of the cross-section of fluid flow channel 101 and lower velocities at locations away from the center of the cross-section of fluid flow channel 101. Radiation 105 emitted from the UV-LED 106 passes through a radiation-focusing element 104 (which may comprise one or more lenses) and is focused (at 103) to impinge on fluid that is traveling in the longitudinal direction in the bore of the longitudinally extending flow channel 101. Radiation-focusing element 104 may be configured (e.g. with lens(es) that are selected, positioned, shaped, fabricated from materials with suitable index of refraction and/or the like) to focus the radiation from UV-LED 106 in such a manner to provide relatively high radiation fluence rate at the center of the cross-section of the bore of the fluid flow channel 101, where the fluid has a relatively high longitudinal direction velocity. Conversely, radiation-focusing element 104 may be configured (e.g. with lens(es) that are selected, positioned, shaped, fabricated from materials with suitable index of refraction and/or the like) to focus the radiation from UV-LED 106 in such a manner to provide relatively low radiation fluence rate at locations spaced apart from the center of the cross-section of the bore of the fluid flow channel 101. With a suitably configured radiation focusing element 104 (e.g. with lens(es) that are selected, positioned, shaped, fabricated from materials with suitable index of refraction and/or the like), the average (over the longitudinal dimension of the longitudinally extending fluid flow channel 101) radiation fluence rate profile across the cross-section of the bore of longitudinally extending flow channel 101 (or a portion thereof) can be positively correlated with, or in some embodiments generally proportional to, the average (over the longitudinal dimension of the longitudinally extending fluid flow channel 101) longitudinal direction velocity fluid velocity profile within the cross-section of the bore of longitudinally extending flow channel 101 (or the portion thereof). Therefore, by the time that the fluid leaves the reactor (or leaves fluid flow channel 101), each component of the fluid may receive similar or comparable aggregate UV radiation dose.

In practice, this may be achieved by constructing radiation-focusing element 104 to comprise one or more focusing lens(es) which focus the radiation into the bore of fluid flow channel 101, based on the expected velocity profile of the fluid in channel 101, in a manner which achieves the above described characteristics. In some embodiments, such focusing lens(es) may comprise: a converging lens 18 as shown in FIG. 1B and/or a collimating lens 15 as shown in FIG. 1A that may not necessarily be positioned at its focal length distance with respect to the UV radiation source; however, other combinations of one or more converging lenses, diverging lenses, and/or collimating lenses may also be used) to achieve the desired radiation fluence rate profile. While only one focusing lens is shown in the illustrated embodiment of FIG. 2A, this is for illustrative convenience only. In some embodiments, focusing element 104 shown in FIG. 2A may comprise multiple lenses (including converging lenses, collimating lenses, a combination thereof and/or the like). In some embodiments (such as those described below with reference to FIGS. 7 and 8), a plurality of focusing lenses (including converging lenses, collimating lenses, a combination thereof and/or the like) may be provided as the radiation-focusing element to focus the radiation into the bore of fluid flow channel 101, based on the expected velocity profile of the fluid in channel 101, in a manner which achieves the above described characteristics. In the illustrated embodiment of FIG. 2A, the radiation 103 inside the bore of fluid flow channel 101 is shown as being semi-transparent, so that the longitudinal direction velocity profile 102 of fluid in the bore of fluid flow channel 101 can be observed.

FIG. 2B shows the side view of a portion of a UV-LED reactor 40 having a longitudinally extending fluid flow channel 111, and a UV-LED 116, in which the fluid (not shown) is moving with a longitudinal direction velocity profile 112 which varies across the cross-section of the bore of fluid flow channel 101. In particular, the fluid in the FIG. 2B embodiment has a maximum velocity ($u_{max}$) at or near the center of the cross-section of fluid flow channel 111 and lower velocities at locations away from the center of the cross-section of fluid flow channel 111. Comparing the illustrated embodiments of FIGS. 2A and 2B, the fluid velocity profile of the FIG. 2B embodiment varies by a greater relative amount across the cross-section of channel 111 than the variation of the fluid velocity profile of the FIG. 2A embodiment across the cross-section of channel 101. That is, in the FIG. 2A embodiment, the difference between the maximum velocity at the center of the cross-section of channel 101 and the velocity at locations away from the center of the cross-section of channel 101 is relatively low, whereas, in the FIG. 2B embodiment, the difference between the maximum velocity at the center of the cross-section of channel 111 and the velocity at locations away from the center of the cross-section of channel 111 is relatively high.

Similarly to the FIG. 2A embodiments, in the FIG. 2B embodiment radiation 115 emitted from the UV-LED 116 passes through a radiation-focusing element 114 (which may comprise one or more lenses) and is focused (at 113) to impinge on fluid that is traveling in the longitudinal direction in the bore of the longitudinally extending flow channel 111. Radiation-focusing element 114 may be configured (e.g. with lens(es) that are selected, positioned, shaped, fabricated from materials with suitable index of refraction and/or the like) to focus the radiation from UV-LED 116 in such a manner to provide higher relative radiation fluence rate at the center of the cross-section of the bore of the fluid flow channel 111, where the fluid has a higher relative longitudinal direction velocity. Conversely, radiation-focusing element 114 may be configured (e.g. with lens(es) that are selected, positioned, shaped, fabricated from materials with suitable index of refraction and/or the like) to focus the radiation from UV-LED 116 in such a manner to provide lower relative radiation fluence rate at locations spaced apart from the center of the cross-section of the bore of the fluid flow channel 111. With a suitably configured radiation focusing element 114 (e.g. with lens(es) that are selected, positioned, shaped, fabricated from materials with suitable index of refraction and/or the like), the average (over the longitudinal dimension of the longitudinally extending fluid flow channel 111) radiation fluence rate profile across the cross-section of the bore of longitudinally extending flow channel 111 (or a portion thereof) can be positively correlated with, or in some embodiments generally proportional to, the average (over the longitudinal dimension of the longitudinally extending fluid flow channel 111) longitudinal direction velocity fluid velocity profile within the cross-section of the bore of longitudinally extending flow channel 111 (or the portion thereof). The result of the FIG. 2B embodiment is the same as that of the FIG. 2A embodiment—i.e. by the time that the fluid leaves the reactor (or leaves fluid flow channel 111), each component of the fluid may receive similar or comparable aggregate UV radiation dose.

In practice, this may be achieved by constructing radiation-focusing element 114 to comprise one or more focusing lens(es) which focus the radiation into the bore of fluid flow channel 111, based on the expected velocity profile of the fluid in channel 111, in a manner which achieves the above described characteristics. In some embodiments, such focusing lens(es) may comprise: a converging lens 18 as shown in FIG. 1B and/or a collimating lens 15 as shown in FIG. 1A that may not necessarily be positioned at its focal length distance with respect to the UV radiation source; however, other combinations of one or more converging lenses, diverging lenses, and/or collimating lenses may also be used) to achieve the desired radiation fluence rate profile. While only one focusing lens is shown in the illustrated embodiment of FIG. 2B embodiment, this is for illustrative convenience only. In some embodiments, focusing element 114 shown in FIG. 2B may comprise multiple lenses (including converging lenses, collimating lenses, a combination thereof and/or the like). In some embodiments (such as those described below with reference to FIGS. 7 and 8), a plurality of focusing lenses (including converging lenses, collimating lenses, a combination thereof and/or the like) may be provided as the radiation-focusing element to focus the radiation into the bore of fluid flow channel 111, based on the expected velocity profile of the fluid in channel 111, in a manner which achieves the above described characteristics.

In the illustrated embodiment of FIG. 2B, the radiation 113 inside the bore of fluid flow channel 111 is shown as being semi-transparent, so that the longitudinal direction velocity profile 112 of fluid in the bore of fluid flow channel 111 can be observed.

FIG. 2C shows the side view of a portion of a UV-LED reactor 50 having a longitudinally extending fluid flow channel 121, and a UV-LED 126, in which the fluid (not shown) is moving with a longitudinal direction velocity profile 122 which varies across the cross-section of the bore of the fluid flow channel 121. In particular, the fluid in the FIG. 2C embodiment has a maximum velocity ($u_{max}$) at or near the center of the cross-section of fluid flow channel 121 and lower velocities at locations away from the center of the cross-section of fluid flow channel 121. Radiation 125 emitted from the UV-LED 126 passes through a radiation-focusing element 124 (which may comprise one or more lenses) and is focused (at 123) to impinge on fluid that is traveling in the longitudinal direction in the bore of the longitudinally extending fluid flow channel 121. Radiation-focusing element 124 may be configured (e.g. with lens(es) that are selected, shaped, positioned, fabricated from materials with suitable index of refraction and/or the like) to focus the radiation from UV-LED 126 in such a manner to provide relatively high radiation fluence rate at the center of the cross-section of the bore of the flow channel 121 (where the fluid has a relatively high longitudinal direction velocity) by first converging (as a result of passing through the one or more lenses of radiation focusing element 124) and then naturally diverging (once it all converges and the photons continue travelling along their paths). Conversely, radiation-focusing element 124 may be configured (e.g. with lens(es) that are selected, shaped, positioned, fabricated from materials with suitable index of refraction and/or the like) to focus the radiation from UV-LED 126 in such a manner to provide relatively low radiation fluence rate at locations spaced apart from the center of the cross-section of the bore of the fluid flow channel 121. With a suitably configured radiation focusing element 124 (e.g. with lens(es) that are selected, positioned, shaped, fabricated from materials with suitable index of refraction and/or the like), the average (over the longitudinal dimension of the longitudinally extending fluid flow channel 121) radiation fluence rate profile across the cross-section of the bore of longitudinally extending flow channel 121 (or a portion thereof) can be positively correlated with, or in some embodiments generally proportional to, the average (over the longitudinal dimension of the longitudinally extending fluid flow channel 121) longitudinal direction velocity fluid velocity profile within the cross-section of the bore of longitudinally extending flow channel 121 (or the portion thereof). The result of the FIG. 2C embodiment is the same as that of the FIG. 2A embodiment and the FIG. 2B embodiment—i.e. by the time that the fluid leaves the reactor (or leaves fluid flow channel 121), each component of the fluid may receive similar or comparable UV aggregate radiation dose.

In practice, this may be achieved by constructing radiation-focusing element 124 to comprise one or more focusing lens(es) which focus the radiation into the bore of fluid flow channel 121, based on the expected velocity profile of the fluid in channel 121, in a manner which achieves the above-described characteristics. In some embodiments, such focusing lens(es) may comprise: a converging lens 18 as shown in FIG. 1B and/or a collimating lens 15 as shown in FIG. 1A that may not necessarily be positioned at its focal length distance with respect to the UV radiation source; however, other combinations of one or more converging lenses, diverging lenses, and/or collimating lenses may also be used) to achieve the desired radiation fluence rate profile. While only one focusing lens is shown in the FIG. 2C embodiment, this is for illustrative convenience only. In some embodiments, focusing element 124 shown in FIG. 2C may comprise multiple lenses (including converging lenses, collimating lenses, a combination thereof and/or the like). In some embodiments (such as those described below with reference to FIGS. 7 and 8), a plurality of focusing lenses (including converging lenses, collimating lenses, a combination thereof and/or the like) may be provided as the radiation-focusing element to focus the radiation into the bore of fluid flow channel 121, based on the expected velocity profile of the fluid in channel 121, in a manner which achieves the above described characteristics. In the illustrated embodiment of FIG. 2C, the radiation 123 inside the bore of the fluid flow channel is shown as being semi-transparent, so that the velocity profile 122 of fluid in the bore of fluid flow channel 121 can be observed.

The velocity profile 112 in the FIG. 2B embodiment differs from the velocity profile 102 in the FIG. 2A. In FIG. 2B, the velocity variation across the cross-section of fluid flow channel 111 is greater when compared to the variation in velocity of the FIG. 2A embodiment (i.e. the variation of the fluid velocity as between the maximum velocity $u_{max}$ at the center of the cross-section of the bore of the fluid flow channel 111 and locations spaced apart from the center of the cross-section of the bore of fluid flow channel 111 of the FIG. 2B embodiment is greater than the variation of the fluid velocity as between the maximum velocity $u_{max}$ at the center of the cross-section of the bore of the fluid flow channel 101 and locations spaced apart from the center of the cross-section of the bore of fluid flow channel 101 of the FIG. 2A embodiment). As such, the radiation-focusing element 114 of the FIG. 2B embodiment is configured (e.g. with lens(es) that are selected, positioned, shaped and/or fabricated from materials with suitable indices of refraction) to focus the radiation in a manner which provides significantly higher fluence rate variation across the cross-section of bore 111 of the FIG. 2B embodiment, relative to the fluence rate variation of the FIG. 2A embodiment (i.e. the variation of the radiation fluence rate as between the center of the cross-section of the bore of the fluid flow channel 111 and locations spaced apart from the center of the cross-section of the bore of fluid flow channel 111 of the FIG. 2B embodiment is greater than the variation of the radiation fluence rate as between the center of the cross-section of the bore of the fluid flow channel 101 and locations spaced apart from the center of the cross-section of the bore of fluid flow channel 101 of the FIG. 2A embodiment). The UV radiation in the FIG. 2B embodiment may be significantly more focused in the center of the cross-section of the bore than at locations spaced apart from the center of the cross-section of the bore.

In comparison, in the FIG. 2A embodiment the velocity is only moderately higher at the center of the cross-section of the bore of the fluid flow channel 101. As such, the radiation-focusing element 104 of the FIG. 2A embodiment is configured (e.g. with lens(es) that are selected, positioned, shaped and/or fabricated from materials with suitable indices of refraction) to provide moderately higher fluence rate variation across the cross-section of bore 101 of the FIG. 2A embodiments relative to the fluence rate variation of the FIG. 2B embodiment (i.e. the variation of the radiation fluence rate as between the center of the cross-section of the bore of the fluid flow channel 101 and locations spaced apart from the center of the cross-section of the bore of fluid flow channel 101 of the FIG. 2A embodiment is less than the variation of the radiation fluence rate as between the center of the cross-section of the bore of the fluid flow channel 111 and locations spaced apart from the center of the cross-section of the bore of fluid flow channel 111 of the FIG. 2B embodiment). The UV radiation of the FIG. 2A embodiment may be moderately more focused in the center of the cross-section of the bore than at locations spaced apart from the center of the cross-section of the bore.

It is to be understood that the radiation-focusing element(s) incorporated into the embodiments of a UV-LED reactor as described herein may be configured (e.g. by suitable selection of lens(es), shaping of lens(es), positioning of lens(es) and/or fabrication of lens(es) out of materials with suitable indices of refraction) to focus the radiation in a manner which can provide relatively different magnitudes of the radiation fluence rate at different locations in the cross-section of the bore and that such radiation fluence rate variation can depend on the fluid velocity profile across the cross-section of the bore. Thus, in cases where the velocity is significantly higher in the center of the cross-section of the bore, the UV radiation may be significantly more focused in the center of the cross-section of the bore of the fluid flow channel to provide significantly greater fluence rate at the center of the cross-section of the bore of the fluid flow channel, as shown in FIG. 2B for example.

FIG. 3 shows the side view of a portion of a UV-LED reactor 60 having a longitudinally extending fluid flow channel 133, a UV-LED 136, and a UV-transparent window 135, in which the fluid (not shown) is moving with a longitudinal direction velocity profile which is shown by arrows 131. The radiation emitted from the LED 136 has a specific radiation fluence rate profile, in the illustrated embodiment, being of relatively high fluence rate at the center of a cross-section of fluid flow channel 133 and relatively low fluence rate at locations away from the center of the cross-section of fluid flow channel 133. A flow restraining element 132 is disposed in fluid flow channel 133 and is configured (e.g. shaped and/or the like) to provide relatively high longitudinal direction flow rate (and velocity) at the center of a cross-section of the bore of flow channel 133, where the fluid is exposed to relatively high radiation fluence rate and relatively low velocity at locations spaced apart from the center of the cross-section of the bore of fluid flow channel 133. Applying an appropriate shape of a flow restraining element 132 can result in alteration of the average (over the longitudinal dimension of flow longitudinally extending flow channel 133) cross-sectional velocity profile of the longitudinally flowing fluid in the bore of the fluid flow channel 133 so that the average (over the longitudinal dimension of flow longitudinally extending flow channel 133) longitudinal direction velocity profile across the cross-section of the bore of the flow channel 133 (or a portion thereof) may be positively correlated with, or in some embodiments generally proportional to, the average (over the longitudinal dimension of flow longitudinally extending flow channel 133) radiation fluence rate profile across the cross-section of the bore of flow channel 133 (or the portion thereof). Therefore, by the time that the fluid leaves the reactor (or fluid flow channel 133), each component of the fluid may receive similar or comparable UV radiation dose.

In practice, this may be achieved using a baffle or other flow restraining element 132 to modify the longitudinal direction velocity profile of the fluid flowing in the bore of the fluid flow channel 133 based on the radiation fluence rate profile. For example, if the radiation fluence rate is significantly higher at the center of the bore of fluid flow channel 133 than at locations away from the center of the bore, a truncated conical baffle (or nozzle) 132 (as shown in FIG. 3) can be applied (with its axis aligned with the longitudinally oriented channel axis) to lead the fluid more to the center of the cross-section of the bore of channel 133 and provide higher fluid velocity at the center of the cross-section of the bore of channel 133 and therefore non-uniform fluid velocity profile at the center of the cross-section of the bore of channel 133. It will be appreciated that flow restraining devices having other shapes having apertures at the center of the cross-section can be used to provide higher fluid velocity at the center of the cross-section of the bore of channel 133. On the other hand, if the radiation fluence rate is relatively uniformly distributed across the cross-section of the bore of channel 133', a small circular or conical baffle 132' (as shown in FIG. 3A) may be used at the center of the cross-section of the bore of channel 133' (held to the channel wall with small holders) to lead the fluid more to the edges of the cross-section of the bore of channel 133' and to thereby increase the velocity at locations away from the center of the cross-section (relative to the velocity at the cross-section), when averaged over the longitudinal length of the channel. It will be appreciated that flow restraining devices having other shapes having apertures away from the cross-sectional center can be used to provide relatively higher fluid velocity at locations away from the center of the cross-section of the bore of channel 133'.

The above-described concepts may also be applied to each channel of multi-channel reactors (e.g. reactors having a plurality of longitudinally extending channels, each such channel similar to the channel shown in FIGS. 2A, 2B, 2C and 3), as described in the following. For the UV-LED reactors described in the exemplary embodiments of FIGS. 4 to 6, the LEDs' radiation patterns may be focused by applying appropriate optical lenses that are either integrated in, or disposed close to, the UV-LEDs. The optical lenses used for focusing UV-LED radiation in the exemplary embodiments of FIGS. 4 to 6, are not expressly shown in the drawings, for the sake of illustrative convenience, as well as for clearer visualization of the reactor concepts.

Figure 5C:
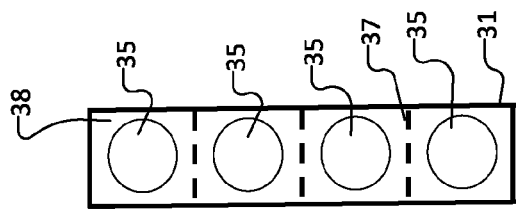
FIG. 5C is a schematic side view of the UV-LED reactor shown in FIG. 4.
Figure 5A:
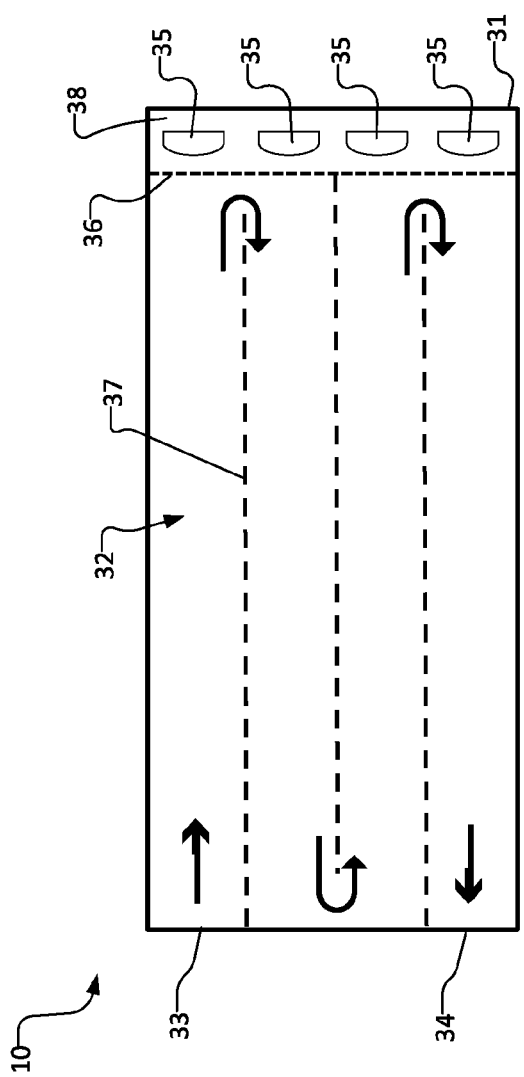
FIG. 5A is a schematic top view of the UV-LED reactor shown in FIG. 4.
Figure 5B:
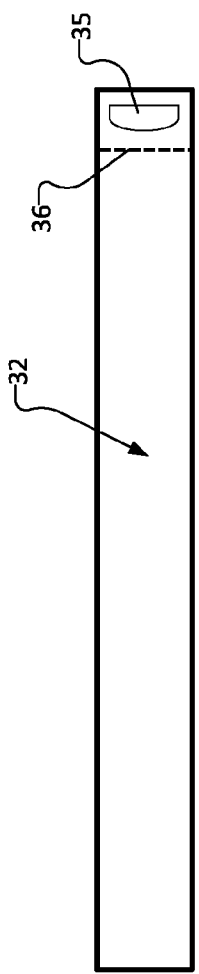
FIG. 5B is a schematic side view of the UV-LED reactor shown in FIG. 4.

FIG. 4 and FIG. 5 show a schematic perspective view (FIG. 4), a top view (FIG. 5A), and side views (FIG. 5B and FIG. 5C) of a UV-LED reactor 10 according to an exemplary embodiment. UV-LED reactor 10 comprises a housing 31, longitudinally extending flow channels 32 with channel walls 37 for conveying fluid (e.g., water) in longitudinal directions therethrough, an inlet 33 for the fluid to enter and an outlet 34 for the fluid to exit, one or more UV-LEDs 35 placed in LED housing 38, and a UV-transparent window 36, such as a quartz window, disposed between LED housing 38 and flow channels 32. UV-LEDs 35 may be mounted on a printed circuit board (not shown). As will be appreciated by those skilled in the art, UV-LED reactor 10 may comprise one or more heat sinks, drive circuits for UV-LEDs 35, microcontrollers and other electronic mechanisms, a power port, and an on/off switch. For the sake of illustrative simplicity, these components are not shown in FIGS. 4 and 5. One or more lenses (not expressly shown in FIGS. 4 and 5), including collimating, converging, and/or other lenses, or a combination thereof, may be disposed in the reactor 10 between UV-LEDs 35 and fluid flow channels 32 to focus the UV-LED radiation pattern into each of longitudinally extending flow channels 32. Each pair of interior adjacent flow channels 32 is in fluid communication at one end of reactor 10 for the fluid to go from one channel 32 to the adjacent channel 32 (the fluid travels through multiple fluid flow channels 32 on its way through the reactor 10). The main fluid flow directions are shown in FIGS. 4 and 5 by the arrows, showing that the fluid flow enters reactor 10 from inlet 33, flows through the longitudinally extending channels 32 and turns at the ends of adjacent interior channels 32 and exits from outlet 34.

In the embodiment of FIG. 4 and FIG. 5, the fluid flows in and out of UV-LED reactor 10, passes through longitudinally extending channels 32, and is irradiated by UV radiation from UV-LEDs 35. LED(s) 35 are positioned at one end of flow channels 32. The main direction of the radiant beams and of the flow are back and forth along the longitudinal direction (e.g., in directions aligned with a longitudinal axis) of longitudinally extending fluid flow channels 32. Reactor 10 may be used for attaining UV photoreaction(s) in the fluid flow. Reactor 10 may also be used for the treatment of a fluid, such as treatment of water. UV-LEDs 35 may be turned on and off automatically by an external signal, such as a signal from a device that detects the fluid flow rate.

Figure 6:
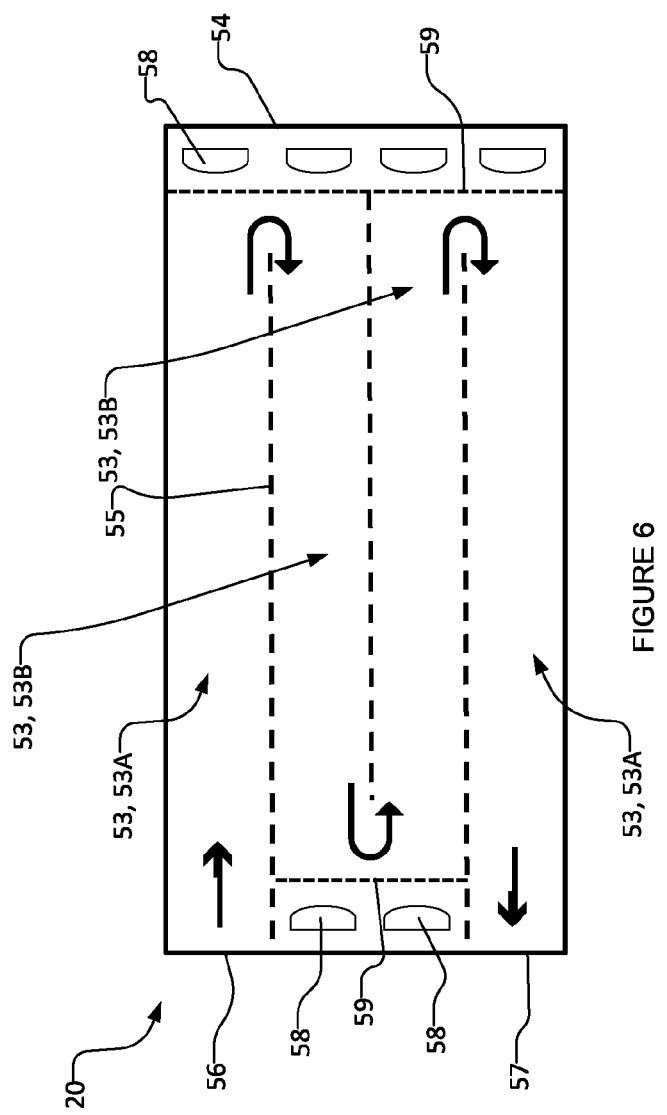
FIG. 6 is a schematic top view of a UV-LED reactor according to a particular example embodiment.

FIG. 6 shows a UV-LED reactor 20 according to an exemplary embodiment of the present invention. In the illustrated embodiment of FIG. 6, UV-LED reactor 20 comprises a housing 54, flow channel walls 55 (which define corresponding longitudinally extending fluid flow channels 53 for conveying fluid such as water in longitudinal dimensions therethrough), an inlet 56 for the fluid to enter and an outlet 57 for the fluid to exit, LEDs 58, and a UV-transparent window 59 disposed between LEDs 58 and the longitudinally extending channels. One or more lenses (not expressly shown in FIG. 6), including collimating, converging, and/or other lenses, or a combination thereof, may be disposed in the reactor 20 between UV-LEDs 58 and the fluid flow channels 53 to focus the UV-LED radiation pattern into each of the longitudinally extending flow channels 53. UV-LED reactor 20 is a multi-channel reactor, where the fluid flow is irradiated by UV-LEDs in some of the longitudinally extending channels 53A from one end (the two exterior channels 53A on the sides of reactor 20 of the FIG. 6 embodiment) and in some of the channels 53B from two ends (the two interior channels 53B of reactor 20 of the FIG. 6 embodiment), as the fluid flow moves through the reactor channels 53. As with any of the embodiments described above, in general, any of the fluid flow channels 53 of reactor 20 could be irradiated from one or both of their longitudinal ends. In some embodiments, this may involve appropriate orientation of inlet 56 and outlet 57 relative to the longitudinal direction, so that the LEDs 58 can be placed at both longitudinal ends of the channel in which the flow enters and exits. The main fluid flow directions of the FIG. reactor 20 are shown by the arrows.

The concepts described above in connection with FIGS. 2A, 2B, 2C and 3 may be applied to each channel of the multi-channel reactors of the embodiments illustrated in FIGS. 4-6. In particular, with suitably configured radiation focusing elements (e.g. with lens(es) that are selected, positioned, shaped, fabricated from materials with suitable index of refraction and/or the like) and/or with suitable selection of flow control element(s), the average (over the longitudinal dimension of each longitudinally extending fluid flow channel) radiation fluence rate profile across the cross-section of the bore of the longitudinally extending flow channel (or a portion thereof) can be positively correlated with, or in some embodiments generally proportional to, the average (over the longitudinal dimension of the longitudinally extending fluid flow channel) longitudinal direction velocity fluid velocity profile within the cross-section of the bore of the longitudinally extending flow channel (or the portion thereof).

Some embodiments of a UV-LED reactor comprise a plurality of UV-LEDs irradiating the fluid flowing through each longitudinally extending fluid flow channel (i.e. a many to one ratio of LEDs to fluid flow channels). In some embodiments, such as those shown in FIGS. 7 and 8 (as described below), a plurality of focusing elements is incorporated (one focusing element for each UV-LED), and the radiation from each UV-LED is focused by its corresponding focusing element and directed into its corresponding channel. In other embodiments, such as those shown in FIGS. 11 and 12 (as described below), one or more focusing elements (or portions thereof) are shared between multiple UV-LEDS and radiation from the multiple UV-LEDs passes through the one or more shared focusing elements into their corresponding channel. In some embodiments, groups of one or more LEDs may share groups of one or more corresponding focusing elements (or one or more corresponding lenses from within one or more corresponding focusing elements) in any suitable matter. For example, there may be a total of 9 LEDs and 3 lenses, where the LEDs are grouped into three groups of 3 LEDs, and the radiation from each group of 3 LEDs passes through a single lens corresponding to the LED group. A UV-LED reactor incorporating multiple UV-LEDs may be particularly suitable for fluid flow channels which have a bore having relatively large cross-section. The multiple UV-LEDs may help to maximize irradiance coverage by increasing irradiance in such fluid flow channels, as compared to an embodiment operated with a single UV-LED for irradiating the fluid flow channel.

FIGS. 7 and 8 show UV-LED reactors 300, 400 in accordance with embodiments comprising multiple UV-LEDs for irradiating each longitudinally extending fluid flow channel (i.e. a many to one ratio of LEDs to fluid flow channels) and multiple focusing elements (i.e. a one to one ratio of LEDS to focusing elements, it being understood that a focusing element may actually comprise multiple lenses). UV-LED reactors 300, 400 are similar in some respects to the reactors 30, 40 of FIGS. 2A and 2B. However, UV-LED reactors 300, 400 differ from UV-LED reactors 30, 40 in that UV-LED reactors 300, 400 comprise a plurality of LED-focusing element assemblies 308, 408 for emitting UV radiation to irradiate the fluid in the longitudinally extending fluid flow channel 301, 401 of each UV-LED reactor 300, 400. Each LED-focusing element assembly 308, 408 comprises a UV-LED 306, 406 and a corresponding radiation-focusing element 307,407 comprising one or more focusing lenses 304, 404. In the illustrated embodiment, focusing elements 308, 408 are shown to comprise one lens 304, 404 for each UV-LED 306, 406. The lens 304, 404 may be integrated in, or disposed proximate or adjacent to, its corresponding UV-LED 306, 406. In some embodiments, focusing elements 308, 408 may comprise one or more lenses 304, 404, each of which may be integrated in, or disposed proximate or adjacent to, its corresponding UV-LED 306, 406. A UV-transparent window 318, 418, such as a quartz window, may be disposed between the LED-focusing element assemblies 308, 408 and the fluid flow channels 301, 401.

In UV-LED reactors 300, 400, the fluid (not shown) is moving with a longitudinal direction velocity profile 312, 412 which varies (as shown by dashed lines 319, 419) across the cross-section of the bore of the fluid flow channel 301, 401. Radiation 315, 415 emitted from the UV-LEDs 306, 406 passes through focusing elements 307, 407 (each focusing element 307, 407 corresponding to a corresponding one of the UV-LEDs 306, 406) and is focused to impinge on fluid that is traveling in the longitudinal direction in the bore of the longitudinally extending flow channel 301, 401. Focusing elements 307, 407 and/or their focusing lenses 304, 404 may be configured (e.g. with lens(es) that are selected, positioned, shaped, fabricated from materials with suitable index of refraction and/or the like) to provide higher relative radiation fluence rate at the center of the cross-section of the bore of the fluid flow channel 301, 401, where the fluid has a higher relative longitudinal direction velocity. Conversely, focusing elements 307, 407 and/or their focusing lenses 304, 404 may be configured (e.g. with lens(es) that are selected, positioned, shaped, fabricated from materials with suitable index of refraction) to provide lower relative radiation fluence rate at locations spaced apart from the center of the cross-section of the bore of the fluid flow channel 301, 401. With suitably configured radiation focusing elements 307, 407 (e.g. with lens(es) 304, 404 that are selected, positioned, shaped, fabricated from materials with suitable index of refraction and/or the like), the average (over the longitudinal dimension of the longitudinally extending fluid flow channel 301,401) radiation fluence rate profile across the cross-section of the bore of longitudinally extending flow channel 301,401 (or a portion thereof) can be positively correlated with, or in some embodiments generally proportional to, the average (over the longitudinal dimension of the longitudinally extending fluid flow channel 301, 401) longitudinal direction velocity fluid velocity profile within the cross-section of the bore of longitudinally extending flow channel 301, 401 (or the portion thereof). Therefore, by the time that the fluid leaves the reactor (or leaves fluid flow channel 301, 401), each component of the fluid may receive similar or comparable aggregate UV radiation dose.

In practice, for example, this may be achieved by constructing each of focusing elements 307, 407 to comprise one or more focusing lenses 304, 404 which focus the radiation into the bore of fluid flow channel 301, 401, based on the expected velocity profile of the fluid in channel 301, 401 in a manner which achieves the above-described characteristics. In some embodiments, such focusing lenses may comprise: a converging lens 18 as shown in FIG. 1B and/or a collimating lens 15 as shown in FIG. 1A that is not necessarily positioned at its focal length distance (with respect to the UV radiation source) or any other suitable lens(es) or combinations of lenses to focus the radiation into the bore of the fluid flow channel 301, 401 based on the expected velocity profile to achieve the desired radiation fluence rate profile. In the illustrated embodiment of FIGS. 7 and 8, the radiation 315, 415 inside the bore of the fluid flow channel 301, 401 is shown as being semi-transparent, so that the longitudinal direction velocity profile 312, 412 of fluid in the bore of the fluid flow channel 301, 401 can be observed.

The velocity profile 312 in the FIG. 7 embodiment differs from the velocity profile 412 in the FIG. 8 embodiment. In FIG. 7, the velocity variation 319 across the cross-section of the fluid flow channel 301 is greater when compared to the variation in velocity 419 of the FIG. 8 embodiment (i.e. the variation of the fluid velocity between the maximum velocity at the center of the cross-section of the bore of the fluid flow channel 301 and locations spaced apart from the center of the cross-section of the bore of fluid flow channel 301 of the FIG. 7 embodiment is greater than the variation of the fluid velocity as between the maximum velocity at the center of the cross-section of the bore of the fluid flow channel 401 and locations spaced apart from the center of the cross-section of the bore of fluid flow channel 401 of the FIG. 8 embodiment). As such, the focusing elements 307 and/or focusing lenses 304 of the FIG. 7 embodiment are configured (e.g. with lenses that are selected, positioned, shaped and/or fabricated from materials having suitable indices of refrations) to focus the radiation in a manner which provides considerably higher fluence rate variation across the cross-section of the bore of channel 301 of the FIG. 7 embodiment, relative to the fluence rate variation across the cross-section of the bore of channel 401 of the FIG. 8 embodiment (i.e. the variation of the radiation fluence rate as between the center of the cross-section of the bore of the fluid flow channel 301 and locations spaced apart from the center of the cross-section of the bore of fluid flow channel 301 of the FIG. 7 embodiment is greater than the variation of the radiation fluence rate as between the center of the cross-section of the bore of the fluid flow channel 401 and locations spaced apart from the center of the cross-section of the bore of fluid flow channels 401 of the FIG. 8 embodiment). The UV radiation in the FIG. 7 embodiment may be significantly more focused in the center of the cross-section of the bore than at locations spaced apart from the center of the cross-section of the bore.

In comparison, in the FIG. 8 embodiment the velocity is only moderately higher at the center of the cross-section of the bore of the fluid flow channel 401. As such, the focusing elements 407 and/or lenses 404 of the FIG. 8 embodiment are configured (e.g. with lenses that are selected, positioned, shaped and/or fabricated from materials having suitable indices of refraction) to provide moderately higher fluence rate variation across the cross-section of bore 401 of the FIG. 8 embodiment relative to the fluence rate variation of the FIG. 7 embodiment (i.e. the variation of the radiation fluence rate as between the center of the cross-section of the bore of the fluid flow channel 401 and locations spaced apart from the center of the cross-section of the bore of fluid flow channel 401 of the FIG. 8 embodiment is less than the variation of the radiation fluence rate as between the center of the cross-section of the bore of the fluid flow channel 301 and locations spaced apart from the center of the cross-section of the bore of fluid flow channel 301 of the FIG. 7 embodiment). The UV radiation may be moderately more focused in the center of the cross-section of the bore 401 of the FIG. 8 embodiment than at locations spaced apart from the center of the cross-section of the bore 401.

Figures 9, 10:
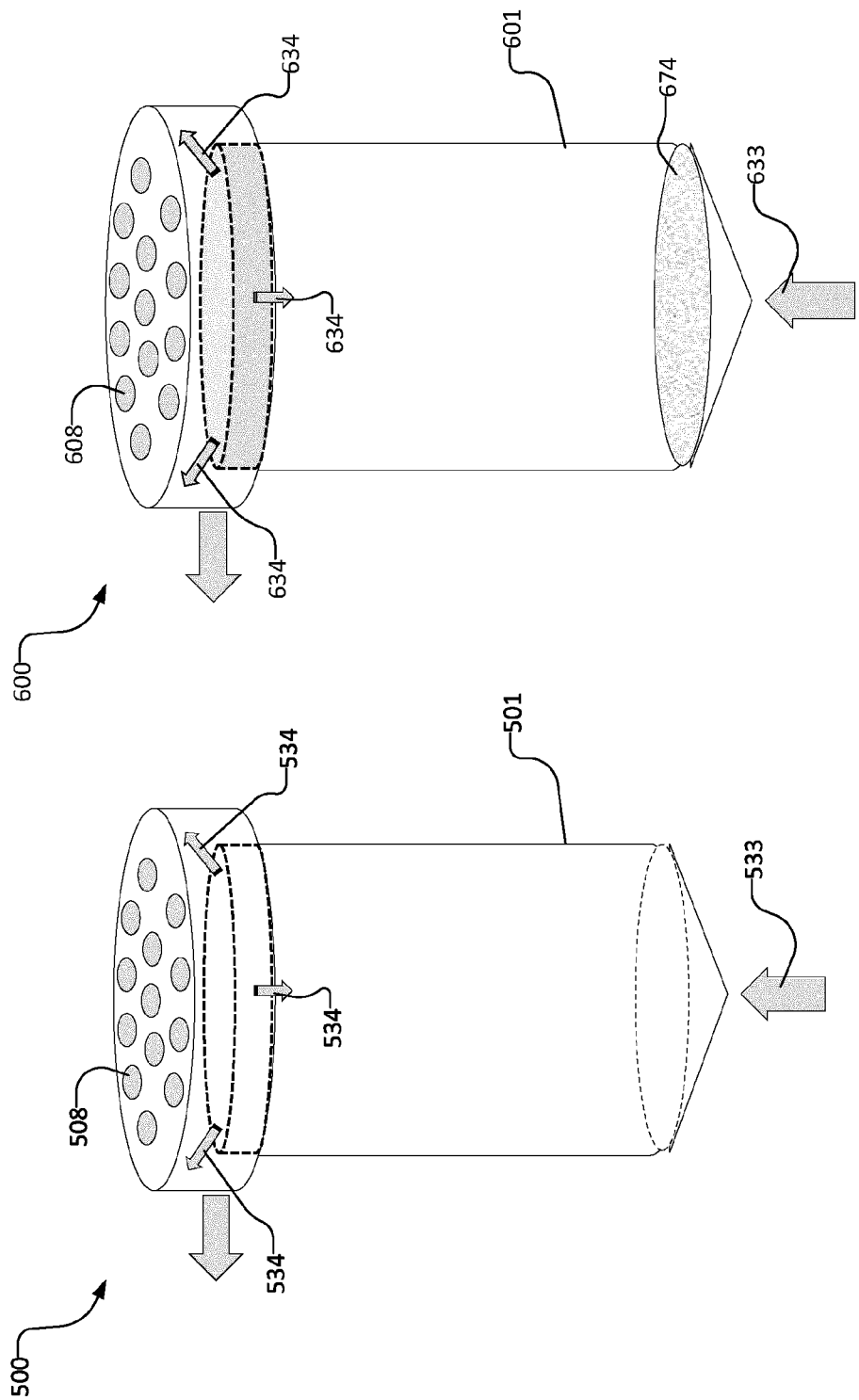
FIG. 9 shows a UV-LED reactor according to an example embodiment comprising multiple outlets.
FIG. 10 shows a UV-LED reactor according to an example embodiment comprising a flow distributor.

FIG. 9 is a top perspective representation of a UV-LED reactor 500 comprising multiple LED-lens assemblies 508 irradiating a longitudinally extending fluid flow channel 501 having a fluid inlet 533, in a manner similar to the UV-LED reactors 300, 400 shown in FIGS. 7 and 8. In the FIG. 9 embodiment, each LED-lens assembly 508 may have similar components to the LED-lens assemblies 308, 408 described above with respect to the FIGS. 7 and 8 embodiments, including radiation-focusing elements which focus the radiation into the bore of the fluid flow channel 501 based on the expected velocity profile so as to provide higher relative radiation fluence rate at the center of the cross-section of the bore of the fluid flow channel 501 (where the fluid has a higher relative longitudinal direction velocity) and lower relative radiation fluence rate at locations spaced apart from the center of the cross-section of the bore of the fluid flow channel 501 (where the fluid has a lower relative longitudinal direction velocity). For clarity of illustration, not specifically shown in FIG. 9, are the components of each LED-lens assembly 508. Also not shown is a UV-transparent window, which may be located between the LED-lens assemblies 508 and the fluid flow channel 501. With suitably configured radiation focusing elements (e.g. with lens(es) that are selected, positioned, shaped, fabricated from materials with suitable index of refraction and/or the like), the average (over the longitudinal dimension of the longitudinally extending fluid flow channel 501) radiation fluence rate profile across the cross-section of the bore of longitudinally extending flow channel 501 (or a portion thereof) can be positively correlated with, or in some embodiments generally proportional to, the average (over the longitudinal dimension of the longitudinally extending fluid flow channel 501) longitudinal direction velocity fluid velocity profile within the cross-section of the bore of longitudinally extending flow channel 501 (or the portion thereof). In the FIG. 9 embodiment, a plurality of fluid outlets 534 are located at one end of the fluid flow channel 501 where the irradiated fluid exits. The multiple outlet configuration shown in FIG. 9 may facilitate relatively more uniform velocity distribution across the cross-section of fluid flow channel 501, particularly for a fluid flow channel which has a bore having a relatively larger cross-section.

FIG. 10 is a top perspective representation of a UV-LED reactor 600 comprising multiple LED-lens assemblies 608 (each comprising similar components to UV-LED assemblies 308, 408) irradiating a longitudinally extending fluid flow channel 601 having a fluid inlet 633. Reactor 600 is similar to the UV-LED reactor 500 of FIG. 9. However, UV-LED reactor 600 differs from UV-LED reactor 500 in that UV-LED reactor 600 also comprises a flow distributor 674 near inlet 633. Flow distributor 674 may comprise one or more flow-restraining elements, such as static mixers, vortex generators, baffles and/or the like. Flow distributor 674 may additionally or alternatively comprise a perforated (e.g. porous) material where the perforation (e.g. porosity) is distributed evenly or unevenly through the body of distributor 674. The porosity of flow distributor 674 may provide a more uniform distribution of the fluid velocity within the cross section of the fluid flow channel 601 and to eliminate the effect of jet flow generated by an inlet 633 with a small cross section, as compared to the cross section of the bore of fluid flow channel 601, if a more uniform velocity distribution is desirable. Flow distributor 674 may be deployed in the fluid flow channel 601 to restrain the fluid flow in the bore of the longitudinally extending fluid flow channel 601 and may be configured (e.g. by suitable shape, size, density, porosity and/or the like) to achieve a desired velocity profile and/or for providing an average (over the longitudinal dimension of the longitudinally extending fluid flow channel 601) longitudinal direction velocity profile over the cross-section of the bore of the longitudinally extending fluid flow channel 601 (or a portion thereof) which is correlated with an average (over the longitudinal dimension of the channel 601) radiation fluence rate profile over the cross-section of the bore of the longitudinally extending fluid flow channel 601 (or a portion thereof).

Figure 12:
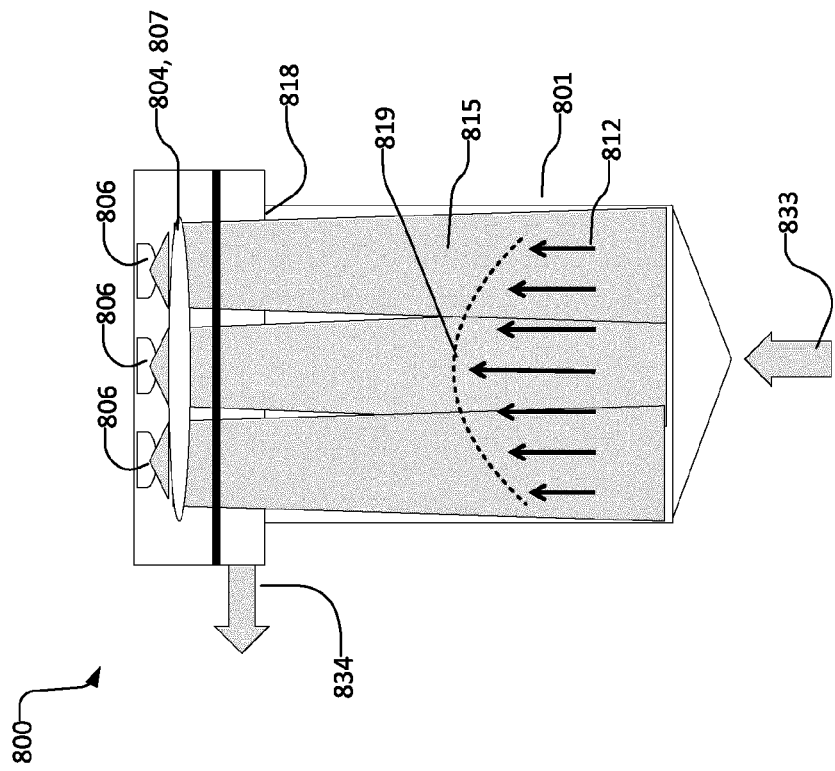
FIGS. 11 and 12 are schematic side views of a portion of a longitudinally extending fluid flow channel of a UV-LED reactor according to a particular embodiment comprising one or more lenses shared by multiple UV-LEDs irradiating the fluid in the flow channel.
Figure 11:
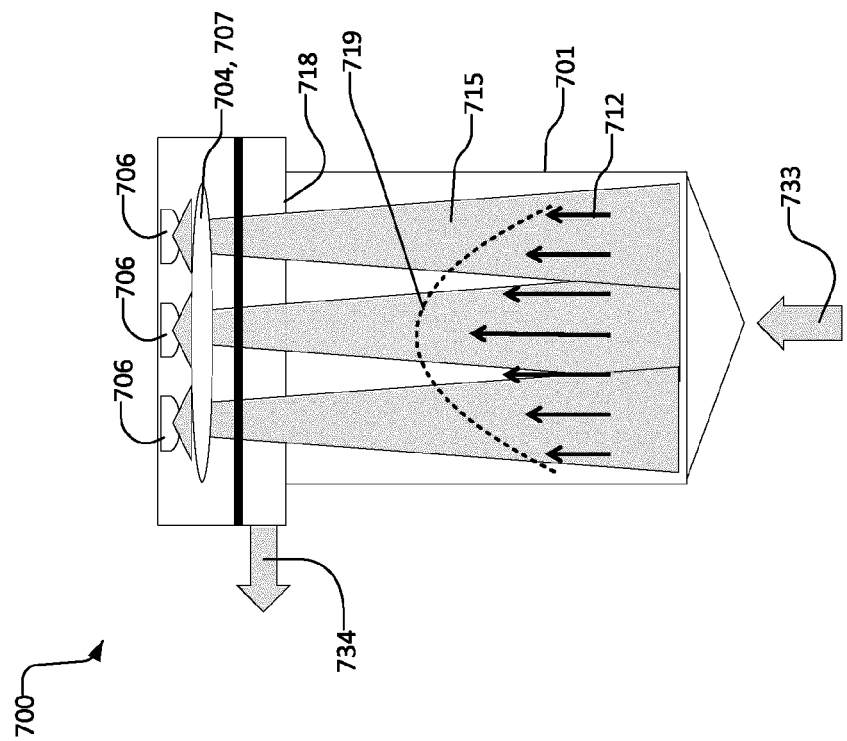

FIGS. 11 and 12 show UV-LED reactors 700, 800 in accordance with embodiments comprising multiple UV-LEDs 706, 806 for irradiating each longitudinally extending fluid flow channel (i.e. a many to one ratio of LEDs to fluid flow channels). In the embodiments of FIGS. 11 and 12, a plurality of LEDs 706, 806 share radiation-focusing elements 707, 807 (i.e. a many to one LED to radiation focusing element ratio) or portions thereof. In the illustrated embodiments of FIGS. 11 and 12, each focusing element 707, 807 is shown as comprising a single lens 704, 804. This is not necessary. In some embodiments, each focusing element 707, 807 may comprise a plurality of lenses 704, 804. In some such embodiments, a plurality of LEDs 706, 806 may share portions of radiation focusing elements 707, 807 (e.g. one or more lenses 704, 804 from within a radiation focusing element 707, 807). UV-LED reactors 700, 800 are similar in some respects to the UV-LED reactors 300, 400 of FIGS. 7 and 8. For example, similarly to UV-LED reactors 300, 400, UV-LED reactors 700, 800 comprise multiple UV-LEDs 706, 806. However, UV-LED reactors 700, 800 differ from UV-LED reactors 300, 400 in that UV-LED reactors 700, 800 comprise multiple LEDs 706, 806 which share radiation focusing elements 707, 807 (i.e. a many to one LED to radiation focusing element ratio) or portions thereof. Radiation-focusing elements 707, 807 focus UV radiation emitted by UV-LEDs 706, 806 to irradiate the fluid in the longitudinally extending fluid flow channel 701, 801 of each UV-LED reactor 700, 800. In the illustrated FIGS. 7 and 8 embodiments, radiation from multiple UV-LEDs 706, 806 passes through shared focusing elements 707, 807 (or portions thereof). A UV-transparent window 718, 818, such as a quartz window, may be disposed between the focusing elements 707, 807 and the fluid flow channels 701, 801.

In UV-LED reactors 700, 800, the fluid (not shown) is moving with a longitudinal direction velocity profile 712, 812 which has a corresponding variation 719, 819 across the cross-section of the bore of the fluid flow channel 701, 801. Radiation 715, 815 emitted from the UV-LEDs 706, 806 passes through focusing elements 707, 807 to impinge on fluid that is traveling in the longitudinal direction in the bore of the longitudinally extending flow channel 701, 801. Lenses 704, 804 of focusing elements 707, 807 may be selected, positioned, shaped, fabricated from materials with suitable index of refraction and/or the like to provide higher relative radiation fluence rate at the center of the cross-section of the bore of the fluid flow channel 701, 801, where the fluid has a higher relative longitudinal direction velocity. Conversely, focusing elements 707, 807 and/or focusing lenses 704, 804 may be configured (e.g. selected, positioned, shaped, fabricated from materials with suitable index of refraction) to provide lower relative radiation fluence rate at locations spaced apart from the center of the cross-section of the bore of the fluid flow channel 701, 801. With suitably configured radiation focusing elements 707, 807 (e.g. with lens(es) 704, 804 that are selected, positioned, shaped, fabricated from materials with suitable index of refraction and/or the like), the average (over the longitudinal dimension of the longitudinally extending fluid flow channel 701, 801) radiation fluence rate profile across the cross-section of the bore of longitudinally extending flow channel 701, 801 (or a portion thereof) can be positively correlated with, or in some embodiments generally proportional to, the average (over the longitudinal dimension of the longitudinally extending fluid flow channel 701, 801) longitudinal direction velocity fluid velocity profile within the cross-section of the bore of longitudinally extending flow channel 701, 801 (or the portion thereof). Therefore, by the time that the fluid leaves the reactor (or leaves fluid flow channel 701, 801), each component of the fluid may receive similar or comparable UV radiation dose.

In practice, this may be achieved by constructing focusing elements 707, 807 to comprise one or more lenses 704, 804 which focus the radiation into the bore of fluid flow channel 701, 801 in a manner which achieves the above-described characteristics. In some embodiments, such focusing lenses may comprise: a converging lens 18 as shown in FIG. 1B and/or a collimating lens 15 as shown in FIG. 1A that is not necessarily positioned at its focal length distance (with respect to the UV radiation source) or any other suitable lens(es) or combinations of lenses to focus the radiation into the bore of the fluid flow channel 701, 801 based on the expected velocity profile to achieve the desired radiation fluence rate profile. In the illustrated embodiment of FIGS. 11 and 12, the radiation 715, 815 inside the bore of the fluid flow channel 701, 801 is shown as being semi-transparent, so that the longitudinal direction velocity profile 712, 812 of fluid in the bore of the fluid flow channel 701, 802 can be observed.

The velocity profile 712 in the FIG. 11 embodiment differs from the velocity profile 812 in the FIG. 12 embodiment. In FIG. 11, the velocity variation 719 across the cross-section of the fluid flow channel 701 is greater when compared to the variation in velocity 819 of the FIG. 12 embodiment (i.e. the variation of the fluid velocity between the maximum velocity at the center of the cross-section of the bore of the fluid flow channel 701 and locations spaced apart from the center of the cross-section of the bore of fluid flow channel 701 of the FIG. 11 embodiment is greater than the variation of the fluid velocity as between the maximum velocity at the center of the cross-section of the bore of the fluid flow channel 801 and locations spaced apart from the center of the cross-section of the bore of fluid flow channel 801 of the FIG. 12 embodiment). As such, the focusing elements 707 and/or focusing lens(es) 704 of the FIG. 11 embodiment are configured (e.g. with lenses 704 that are selected, positioned, shaped and/or fabricated from materials having suitable indices of refraction) to focus the radiation in a manner which provides considerably higher fluence rate variation across the cross-section of the bore of channel 701 of the FIG. 11 embodiment, relative to the fluence rate variation across the cross-section of the bore of channel 801 of the FIG. 12 embodiment (i.e. the variation of the radiation fluence rate as between the center of the cross-section of the bore of the fluid flow channel 701 and locations spaced apart from the center of the cross-section of the bore of fluid flow channel 701 of the FIG. 11 embodiment is greater than the variation of the radiation fluence rate as between the center of the cross-section of the bore of the fluid flow channel 801 and location spaced apart from the center of the cross-section of the bore of fluid flow channel 801 of the FIG. 12 embodiment). The UV radiation in the FIG. 11 embodiment may be significantly more focused in the center of the cross-section of the bore than at locations spaced apart from the center of the cross-section of the bore.

In comparison, in the FIG. 12 embodiment the velocity is only moderately higher at the center of the cross-section of the bore of the fluid flow channel 801. As such, the focusing elements 807 and/or lenses 804 of the FIG. 8 embodiment are configured (e.g. with lenses that are selected, positioned, shaped and/or fabricated from materials having suitable indices of refraction) to provide moderately higher fluence rate variation across the cross-section of bore 801 of the FIG. 12 embodiment relative to the fluence rate variation of the FIG. 11 embodiment (i.e. the variation of the radiation fluence rate as between the center of the cross-section of the bore of the fluid flow channel 801 and locations spaced apart from the center of the cross-section of the bore of fluid flow channel 801 of the FIG. 12 embodiment is less than the variation of the radiation fluence rate as between the center of the cross-section of the bore of the fluid flow channel 701 and locations spaced apart from the center of the cross-section of the bore of fluid flow channel 701 of the FIG. 11 embodiment). The UV radiation may be moderately more focused in the center of the cross-section of the bore 801 of the FIG. 12 embodiment than at locations spaced apart from the center of the cross-section of the bore 801.

The reactors and methods of using the reactors described herein may provide efficient and compact UV-LED reactors that may be applied to any UV-activated photoreaction or photocatalytic reaction. One of these applications is UV-based water treatment, particularly water purification or disinfection by UV-inactivation of microorganisms and UV-based degradation of chemical contaminants. For example, some embodiments may be particularly suitable for processing low to moderate flow rates of water, such as in point-of-use or point-of-entry water purification applications, as described elsewhere herein, including the description below. Further, the reactors and methods of using reactors described herein can be optimized based on a combination of UV-LED radiation patterns and the flow field hydrodynamics to provide superior (or at least relatively more consistent) UV dose delivery to the fluid as compared to existing UV-LED reactors.

Some aspects of the invention provide a reactor designed to control the average (over a longitudinal dimension of a longitudinally extending channel) radiation fluence rate distribution and/or the average (over a longitudinal dimension of a longitudinally extending channel) longitudinal direction velocity distribution over a cross-section (or a portion of the cross-section) of the bore of a longitudinally extending fluid flow channel, so that the reactor imparts similar or comparable UV dose (a product of radiation fluence rate and residence time) to all (or substantially all) of the fluid elements travelling through the bore of the fluid flow channel. As discussed, one or both of these parameters (the average radiation fluence rate distribution across the cross-section (or portion thereof) and/or the average longitudinal direction fluid velocity across the cross-section (or portion thereof)) may be controlled to achieve an average radiation fluence rate that is positively correlated with, and in some embodiments generally proportional to, an average velocity profile over a cross-section of the bore of the channel (or a portion thereof). For brevity, these characteristics (as described in more particular detail elsewhere herein) may be referred to as velocity-fluence rate matching. In some embodiments. such velocity-fluence rate matching may achieve similar or comparable UV dose to all of the fluid elements as the fluid traverses the longitudinal dimension of the longitudinally extending fluid flow channel. It will be appreciated that the cross-sectional longitudinal direction velocity profile of a fluid travelling in the bore of a longitudinally extending fluid flow conduit depends on the Reynolds number of the fluid, which is a material characteristic of the fluid properties along with the characteristics of the bore of the fluid flow channel and the fluid velocity. It will be further appreciated that the longitudinal direction fluid flow velocity of any fluid element need not be constant, but can change as the fluid moves along the longitudinal dimension of the flow channel (e.g. the fluid element may move from a higher velocity central location within the cross-section to a lower velocity location away from the center of the cross-section or vice versa during its movement through the flow channel).

While the foregoing written description of the invention enables one of ordinary skill to make and use what is considered presently to be the best mode thereof, those of ordinary skill will understand and appreciate the existence of variations, combinations, and equivalents of the specific embodiments, methods, and examples herein. The invention should therefore not be limited by the above described embodiments, methods, and examples.

Further example embodiments of UV-LED based photoreactors which could incorporate the above-described radiation dose-control methods and apparatus (with reference to FIGS. 1 to 12) are described below.

For example, various channel configurations of UV-LED reactors according to example embodiments are described below with reference to FIGS. 13 to 18. In these embodiments, the UV-LED reactors may incorporate radiation dose-control methods and apparatus (such as radiation-focusing elements and/or flow-restraining elements, as described elsewhere herein) even if such radiation-focusing elements and/or flow-restraining elements are not specifically shown or described in the figures.

FIGS. 13A to 13E show side views of single channel UV-LED reactor configurations according to exemplary embodiments. In general, these configurations may be applied to both single and multi-channel UV-LED reactors. The inlet and outlet orientations and their fluid flow directions may be different for a multi-channel reactor as compared to those for a single-channel reactor. The straight black arrows indicate the main direction of the flow, both in the reactors and in the inlet and outlet of the reactors.

Figure 13A:
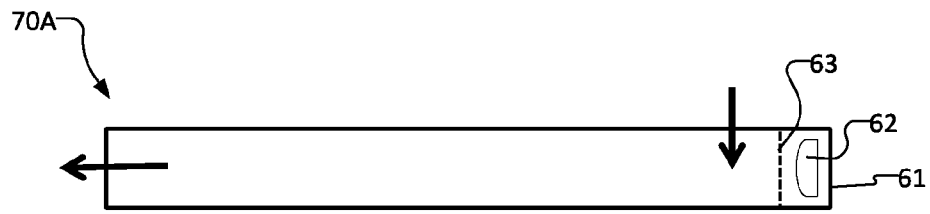
FIGS. 13A to 13E are partially-diagrammatic side views of example embodiments of UV-LED reactors.

FIG. 13A is a side view of a UV-LED reactor 70A comprising a housing 61, a UV-LED 62, and a UV-transparent window 63. This single-channel reactor is irradiated from only one end of the flow channel, providing flexibility in the outlet direction. A chemical reagent (not shown) may be added to the reactor along with the fluid flow to cause desirable photoreactions. Velocity-fluence rate matching may be achieved in the FIG. 13A embodiment using any of the techniques described herein.

Figure 13B:
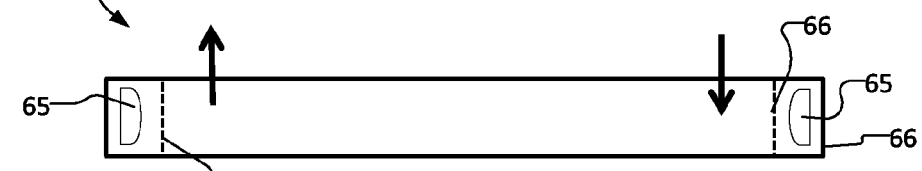

FIG. 13B is a side view of a UV-LED reactor 70B comprising a housing 64, two or more UV-LEDs 65, and UV-transparent windows 66. UV-LED reactor 70B is irradiated from both ends of the flow channel (by at least one UV-LED 65 positioned at each end), offering a higher radiation fluence compared to the FIG. 7A configuration which is irradiated from only one end. Each UV-LED 65 may emit UV radiation of a specific wavelength (which may be the same or different). Where the wavelengths of each UV-LED 65 are different, the FIG. 13B embodiment may provide a combination of different wavelengths irradiating the fluid flow and one (or both) of these wavelengths may exhibit velocity-fluence rate matching. Where the wavelengths of each UV-LED 65 are the same, the radiation from the combination of UV-LEDs 65 in the FIG. 13B embodiment may exhibit velocity-fluence rate matching.

Figure 13C:
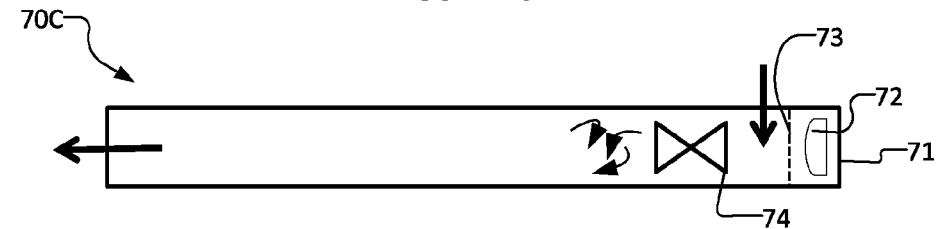

FIG. 13C is a side view of a UV-LED reactor 70C comprising a housing 71, a UV-LED 72, a UV-transparent window 73, and a static mixer 74 or other such element to restrain the fluid flow. The curved black arrows indicate mixing of the fluid after passing through the static mixer 74. The static mixer 74 is applied to facilitate mixing and the generation of potential vortices for the improvement of the UV-LED reactor hydrodynamics and may thus be referred to as a vortex generator. Mixing may result in a relatively more uniform distribution of the longitudinal direction fluid velocity, even although velocity components in other directions may be relatively less uniform. Providing relatively more uniform distribution of the longitudinal direction fluid velocity may make it easier to implement a corresponding fluence rate distribution and ultimately easier to achieve velocity-fluence rate matching.

Figure 13D:
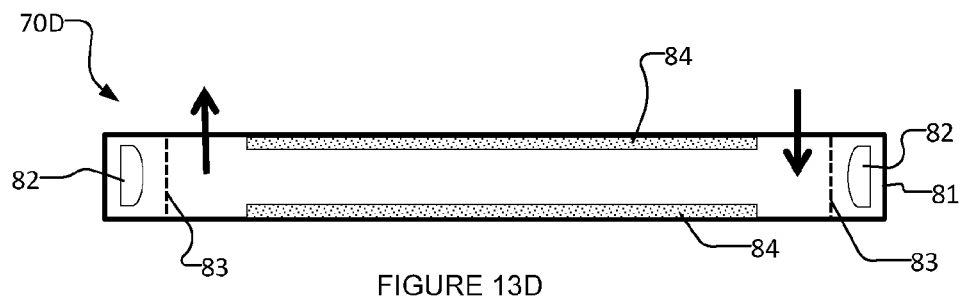

FIG. 13D is a side view of a UV-LED reactor 70D comprising a housing 81, one or more UV-LEDs 82, UV-transparent windows 83, and a photocatalyst immobilized on support structures 84. The photocatalyst is activated by UV radiation from the UV-LEDs to initiate photocatalytic reactions in the UV-LED reactor. Velocity-fluence rate matching may be achieved in the FIG. 13D embodiment using any of the techniques described herein.

Figure 13E:
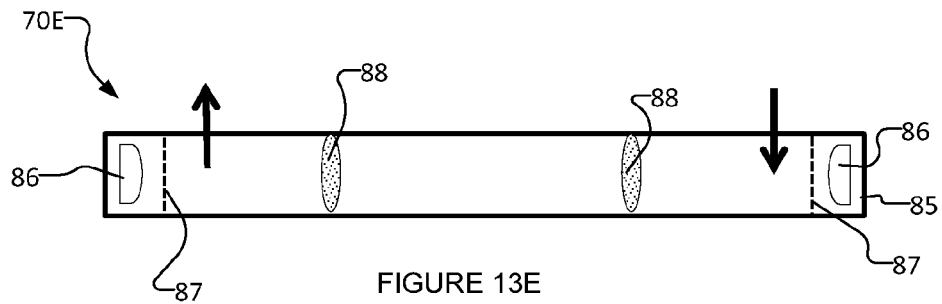

FIG. 13E is a side view of a UV-LED reactor 70E comprising a housing 85, UV-LEDs 86, UV-transparent windows 87, and photocatalyst immobilized on perforated support structures 88. The photocatalyst is activated by UV radiation from the UV-LEDs to initiate photocatalytic reactions. This configuration, in which the photocatalyst is disposed in the reactor channel cross-section may provide high radiation flux to the photocatalyst. Velocity-fluence rate matching may be achieved in the FIG. 13E embodiment using any of the techniques described herein.

Figure 14A:
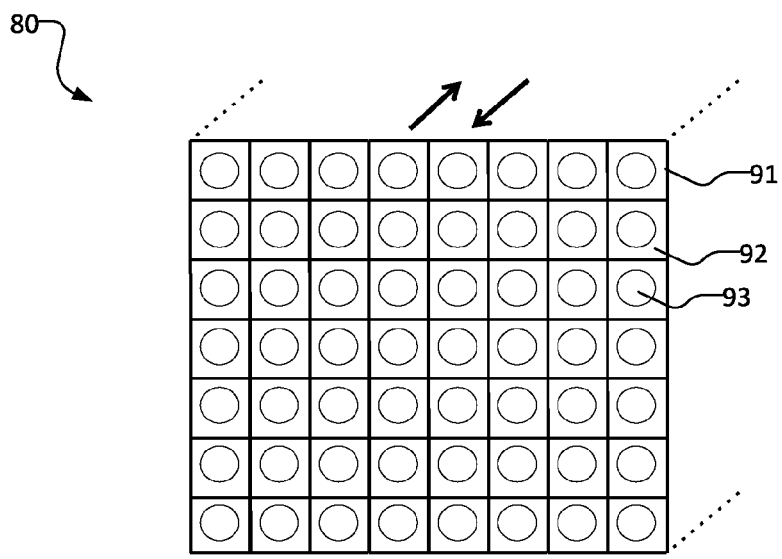
FIGS. 14A and 14B are partially-diagrammatic side views of example embodiments of UV-LED reactors.
Figure 14B:
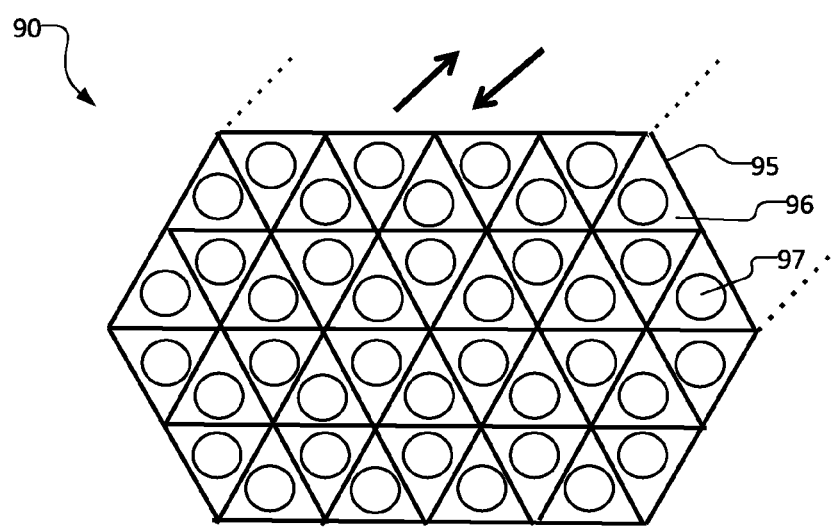

FIGS. 14A and 14B are side views (with the dotted lines showing the direction of the third dimension) of two UV-LED reactors 80 and 90 according to exemplary embodiments comprising a stack of longitudinally extending fluid flow channels. FIG. 14A shows a side view of a UV-LED reactor 80 comprising a housing 91, a stack of longitudinally extending fluid flow channels 92, each having a rectangular cross section, and a plurality of UV LEDs 93. FIG. 14B shows the side view of a UV-LED reactor 90 comprising a housing 95, a stack of longitudinally extending fluid flow channels 96, each having a triangular cross-section, and a plurality of UV-LEDs 97. In either of these embodiments, the fluid is irradiated by the UV LEDs as it moves through the stack of longitudinally extending fluid flow channels. Velocity-fluence rate matching may be achieved in each of the flow channels of the FIGS. 14A and 14B embodiments using any of the techniques described herein. Such configuration facilitates the manufacture of UV-LED reactors which may deliver high UV fluence (dose) and/or high throughput. The cross-section of the fluid flow channels may be rectangular (FIG. 14A), triangular (FIG. 14B), or another shape. The main fluid flow directions are shown by the arrows. Other components of UV-LED reactors 80, 90 including UV-transparent windows, etc. are not shown so as not to obscure the remaining components in the illustration.

Figure 15A:
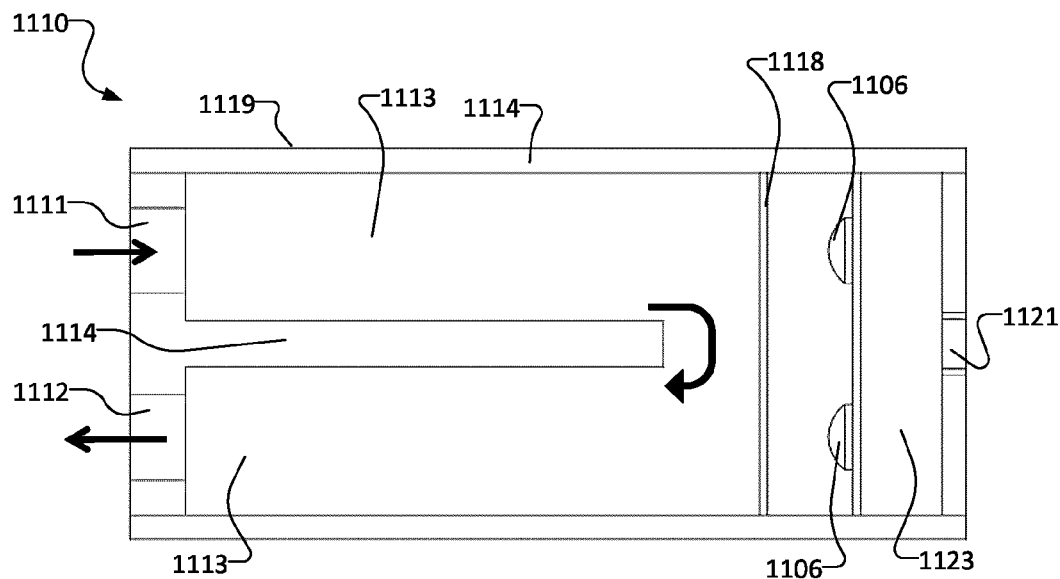
FIGS. 15A, 15B and 15C are partially-diagrammatic top, side and perspective views, respectively, of an example embodiment of a UV-LED reactor.
Figure 15B:
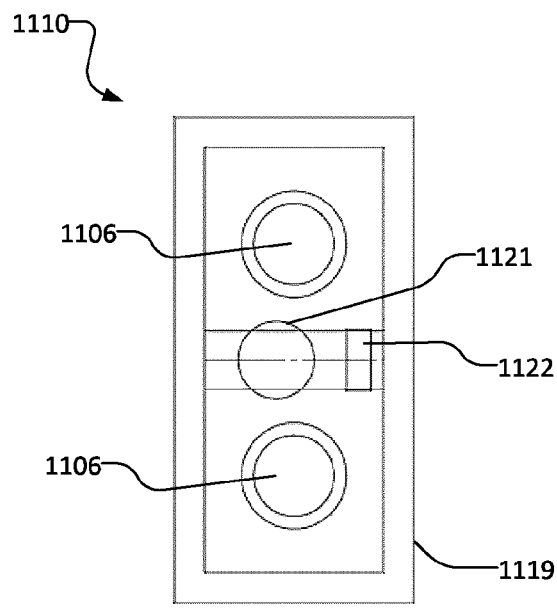
Figure 15C:
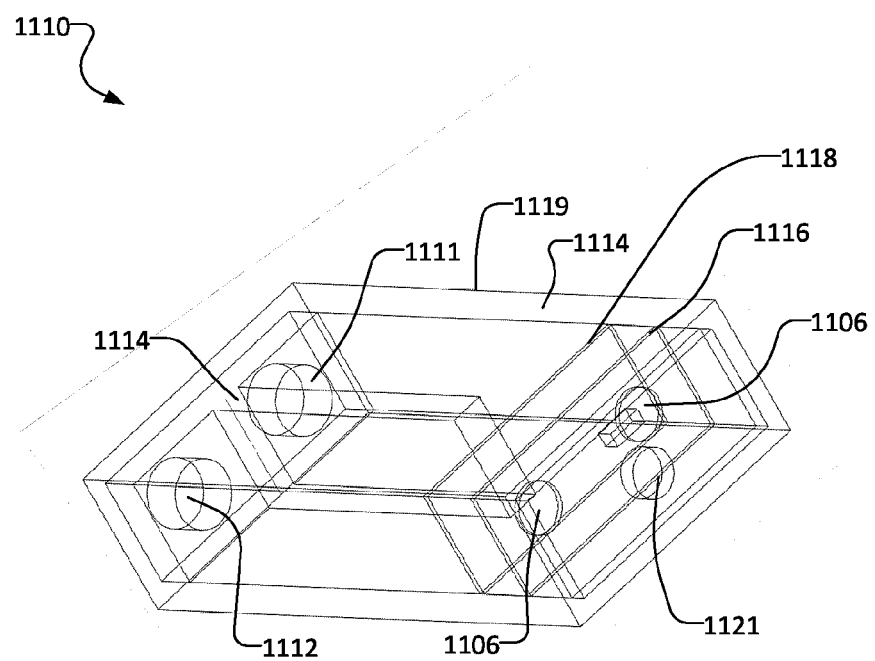

FIGS. 15A to 15C show a top view (FIG. 15A), a side view (FIG. 15B), and a perspective view (FIG. 15C) of a UV-LED reactor 1110 according to an exemplary embodiment. The UV-LED reactor 1110 comprises: a housing 1119, a pair of adjacent longitudinally extending fluid flow channels 1113 with channel walls 1114 for conveying fluid (e.g. water) in longitudinal directions therethrough, an inlet 1111 for the fluid to enter and an outlet 1112 for the fluid to exit. UV-LED reactor 1110 also comprises: two (or more) UV-LEDs 1106 mounted on a circuit board 1116, a UV-transparent window 1118 such as a quartz window disposed between the circuit board 1116 and the fluid flow channels 1113, an on/off switch 1121, and a power port 1122. The drive circuits for the UV-LED, microcontrollers, and other electronic mechanisms (not shown) may be placed in an electronic housing 1123 between the LED circuit board 1116 and the on/off switch 1121. Different lenses (not shown), including collimating, converging, diverging and/or other lenses (not shown) may be disposed in the reactor 1110 between UV-LEDs 1106 and the longitudinally extending fluid flow channels 1113 to focus the UV-LED radiation pattern into the fluid flow channels 1113. The fluid flow channels 1113 are in fluid communication at one end for the fluid to go from one channel 1113 to the adjacent channel 1113. As indicated by the arrows, which show the main fluid flow directions, the fluid enters reactor 1110 from inlet 1111, flows through a first longitudinally extending fluid flow channel 1113 and after turning at the end of the adjacent interior channels 1113 continues through the second longitudinally extending fluid flow channel 1113 before exiting from outlet 1112. The fluid flows in and out of the UV-LED reactor 1110, passes through the channels 1113, and is irradiated by UV radiation from UV-LEDs 1106. Velocity-fluence rate matching may be achieved in each of the flow channels of the FIG. 15A-15O embodiment using any of the techniques described herein.

Figure 16A:
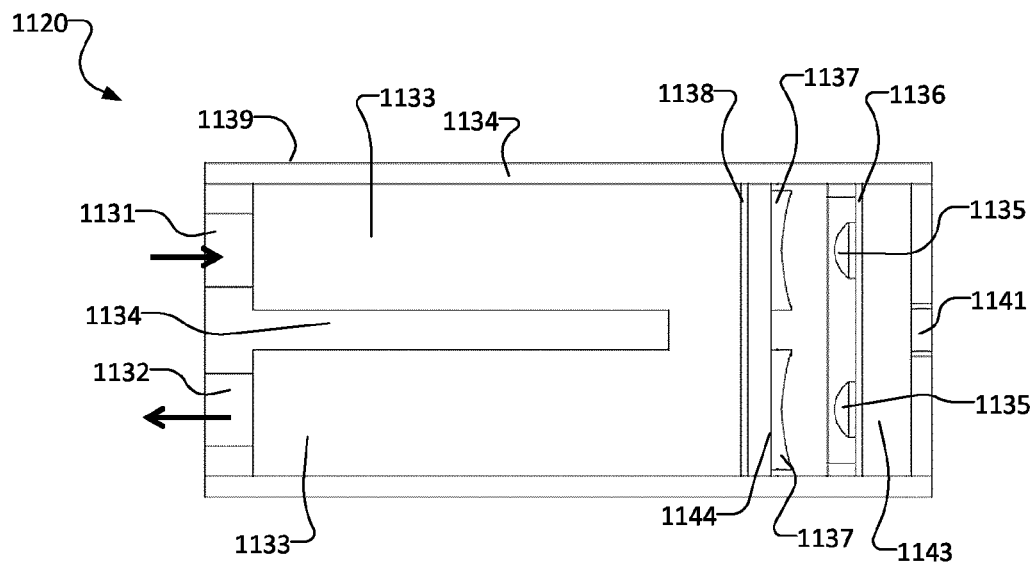
FIGS. 16A, 16B and 16C are partially-diagrammatic top, side and perspective views, respectively, of an example embodiment of a UV-LED reactor.
Figure 16B:
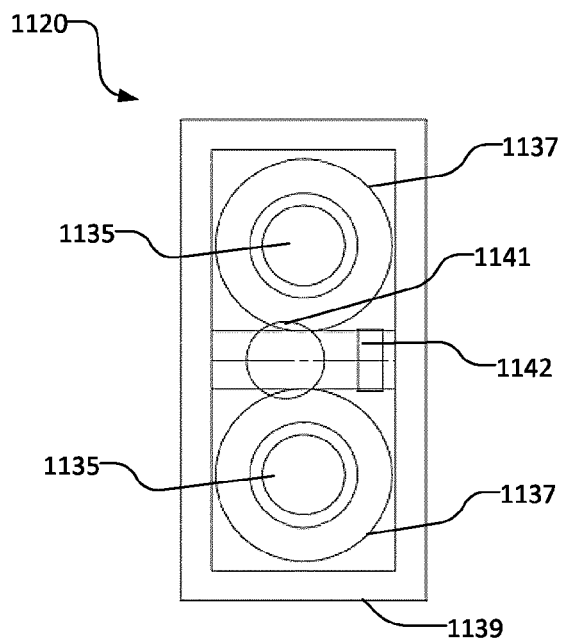
Figure 16C:
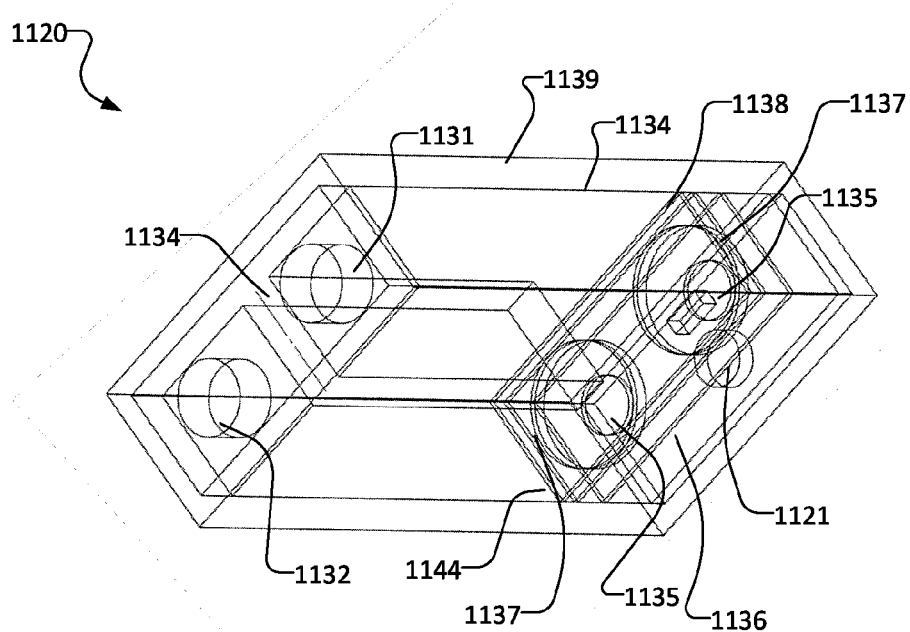
Figure 16D:
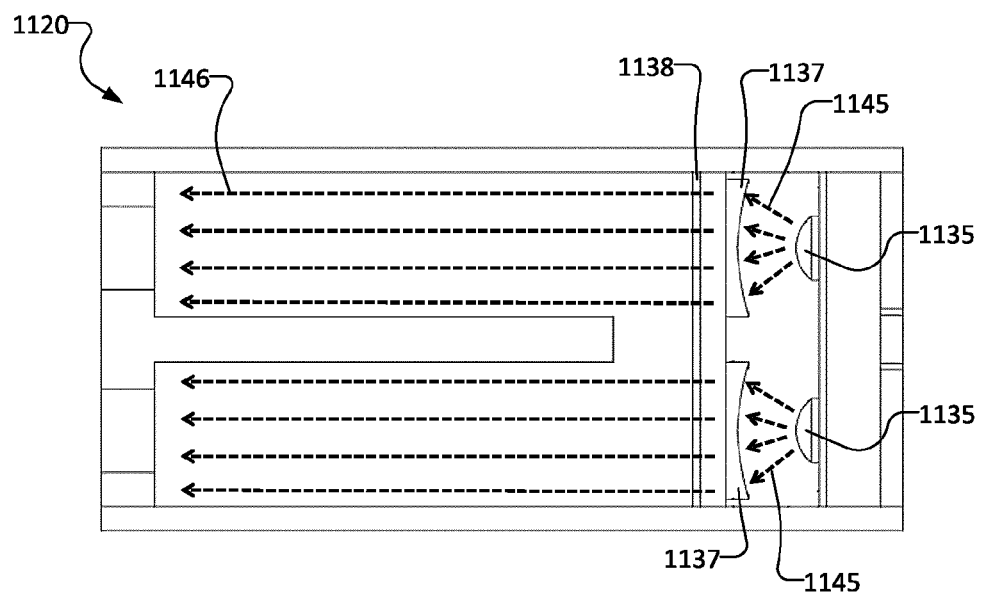
FIG. 16D is a partially-diagrammatic top view of the embodiment of FIGS. 16A, 16B and 16C, showing UV rays.

FIGS. 16A to 16D show a top view (FIG. 16A and FIG. 16D), a side view (FIG. 16B), and a perspective view (FIG. 16C) of a UV-LED reactor 1120 according to an exemplary embodiment. UV-LED reactor 1120 comprises a housing 1139, a pair of adjacent longitudinally extending fluid flow channels 1133 with channel walls 1134 for conveying fluid (e.g. water) in longitudinal directions therethrough, an inlet 1131 for the fluid to enter, an outlet 1132 for the fluid to exit, and UV-LEDs 1135 mounted on a circuit board 1136. Collimating lenses are 1137 may be disposed on a frame 1144 in the reactor 1120 between UV-LEDs 1135 and fluid flow channels 1133 to focus the UV-LED radiation pattern into the longitudinally extending fluid flow channels 1133. Reactor 1120 also comprises a UV-transparent window 1138, such as a quartz window, disposed between the frame 1144 holding the collimating lenses 1137 and the fluid flow channels 1133. Reactor 1120 comprise an on/off switch 1141 and a power port 1142. The drive circuits for UV-LEDs, microcontrollers, and other electronic mechanisms (not shown), may be placed in the electronic housing 1143, between the LED circuit board 1136 and the on/off switch 1141. The collimating lenses 1137 collimate UV radiation from the UV-LEDs 1135 into the fluid flow channels. In some embodiments, the UV-LED 1135 may have a converging lens integrated in the LED. The presence of both a converging lens and a collimating lens disposed in front of a UV-LED 1135 may provide a more effective way of irradiating the fluid flow. Referring to FIG. 16D, there are shown UV rays 1145 emitted from the UV-LEDs 1135 and passing through the collimating lenses 1137 to become collimated rays 1146. The fluid flows in and out of the UV-LED reactor 1120, passes through the channels 1133, and is irradiated by UV collimated rays 1146 in the reactor channels 1133. This reactor configuration may have a circular cross section of the flow channels. The main directions of UV rays are shown by the dashed arrows. Velocity-fluence rate matching may be achieved in each of the flow channels of the FIG. 16A-16D embodiment using any of the techniques described herein.

Figure 17A:
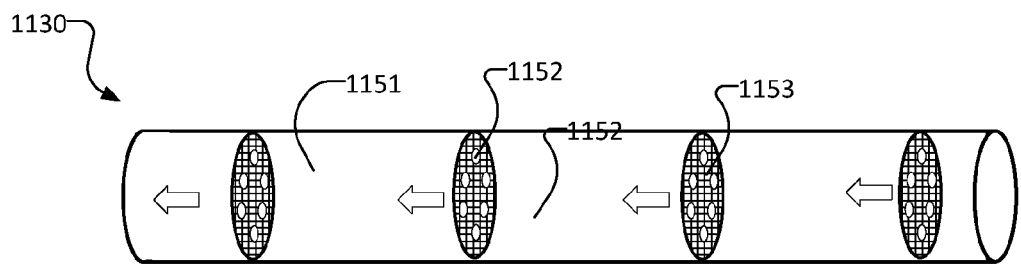
FIGS. 17A and 17B are partially-diagrammatic perspective views of example embodiments of a UV-LED reactor.
Figure 17B:
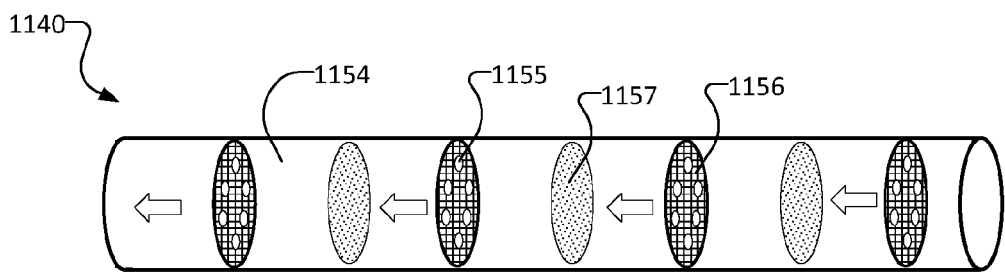

FIGS. 17A and 17B show partially-diagrammatic perspective views of two configurations for UV-LED reactors, irradiated by UV-LEDs, and disposed through the length of the longitudinally extending fluid flow channels. For clearer illustration of the concepts explained herein, only the UV-LEDs, UV-LED boards, and photocatalyst structures of the UV-LED reactors are shown in these figures. FIG. 17A illustrates a UV-LED reactor 1130 comprising a series of perforated boards 1153 on which are mounted UV-LEDs 1152, wherein the fluid flow (not shown) in the longitudinally extending fluid flow channel 1151 is irradiated by the UV-LEDs 1152. FIG. 17B illustrates a UV-LED reactor 1140, comprising a series of perforated boards 1156 on which are mounted UV-LEDs 1155, and a series of photocatalyst structures 1157, wherein the fluid flow (not shown) and the photocatalyst structures in the longitudinally extending fluid flow 1154 are irradiated by the UV-LEDs 1155. The arrows show the overall direction of the fluid flow as it moves past the UV-LEDs and photocatalyst structures. The fluid flow passes through the LED perforated boards and the photocatalyst structures. This configuration may cause photoreactions and photocatalytic reactions in the fluid. Velocity-fluence rate matching may be achieved in the embodiments of FIGS. 17A and 17B using any of the techniques described herein.

Figure 18A:
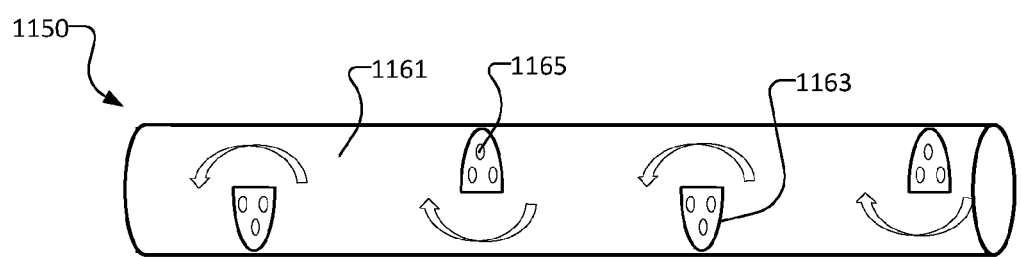
FIGS. 18A and 18B are partially-diagrammatic perspective views of example embodiments of a UV-LED reactor.
Figure 18B:
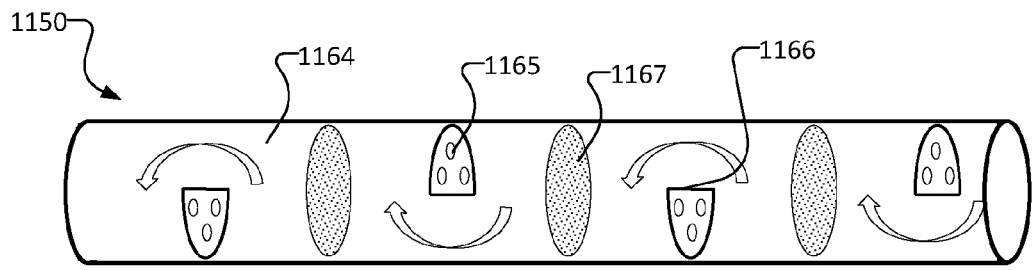

FIGS. 18A and 18B show partially-diagrammatic perspective views of two configurations for UV-LED reactors, irradiated by UV-LEDs, and disposed throughout the length of the fluid flow channels. For clearer illustration of the concepts explained herein, only the UV-LEDs, UV-LED boards, and photocatalysts parts of the UV-LED reactors are shown in these figures. FIG. 18A illustrates a UV-LED reactor 1160, comprising a series of solid boards 1163 on which are mounted UV-LEDs 1162, wherein the fluid flow (not shown) in the longitudinally extending fluid flow channel 1161 irradiated by the UV-LEDs 1162. FIG. 18B illustrates a UV-LED reactor 1170, comprising a series of solid boards 1166 on which are mounted UV-LEDs 1165, and a series of photocatalyst structures 1167, wherein the fluid flow (not shown) and the photocatalyst structures in the longitudinally extending fluid flow channel 1164 are irradiated by the UV-LEDs 1165. The arrows show the overall direction of the fluid flow moving past the UV-LEDs 1162, 1165 and photocatalyst structures 1167. As indicated by the curved arrows, the fluid flow passes on the open side of the LED board (part of the channel that is not occupied by the UV-LED board) and through the photocatalyst structures. This configuration may cause photoreactions and photocatalytic reactions in the fluid. Velocity-fluence rate matching may be achieved in the embodiments of FIGS. 18A and 18B using any of the techniques described herein.

In the UV-LED reactor configurations presented in FIG. 17 and FIG. 18, the fluid flow and the photocatalyst structures may be irradiated by UV-LEDs from one or both sides. As such, UV-LEDs may be mounted on either or both sides of the LED board. Further, in either of the configurations presented in FIGS. 17 and 18, static mixers (not shown) may be disposed in the reactor to alter the fluid flow hydrodynamics.

The longitudinally extending fluid flow channels described herein have a cross section which may take any suitable shape, including, without limitation, a circle, a semi-circle, a square, a rectangle, a triangle, a trapezoid, a hexagon, and the like. These cross sections may enhance the reactor performance by improving the reactor hydrodynamics and/or radiation distribution given certain fluid flow conditions and UV-LED radiation patterns. For example, a fluid flow channel having a circular cross section may provide optimal radiation transfer to the fluid for UV-LED collimated radiation.

Embodiments of the technology described herein are directed to providing an efficient and compact UV-LED reactor which is applicable to a range of UV-activated photoreaction or photocatalytic reaction in a fluid. For example, as described herein, one of these applications is water purification by UV-inactivation of microorganisms and UV-based degradation of chemical contaminants.

Particular applications of the UV-LED reactor include processing and treating water of low to moderate flow rates, for example, in point-of-use applications. Further, due to its compact configuration and high efficiency, the UV-LED reactor in accordance with the embodiments described herein may be incorporated in appliances (e.g. refrigerators, freezers, water coolers, coffee machines, water dispensers, icemakers, etc.), health care or medical devices or facilities, dental equipment, and any other devices which require the use of clean water. The UV-LED reactor may be either incorporated into the device or be applied as an add-on into the existing device. For example, the UV-LED reactor may be positioned somewhere through the waterline so that the UV-LED reactor treats the water that is used in (e.g. passing through the waterline of) the device. This may be of particular interest where it is desirable that the fluid be irradiated/treated while passing through a pipe, or where there is a desire to prevent the formation of potential microorganism biofilm inside a pipe, or where it is desirable that the flow be treated at the end of a pipeline before being used. The UV-LED reactor may be integrated in the device along with one or more other forms of water purification methods (such as filtration). Exemplary point-of-use fluid treatment applications of the UV-LED reactor are next described with references to FIGS. 19 to 21.

Figure 19:
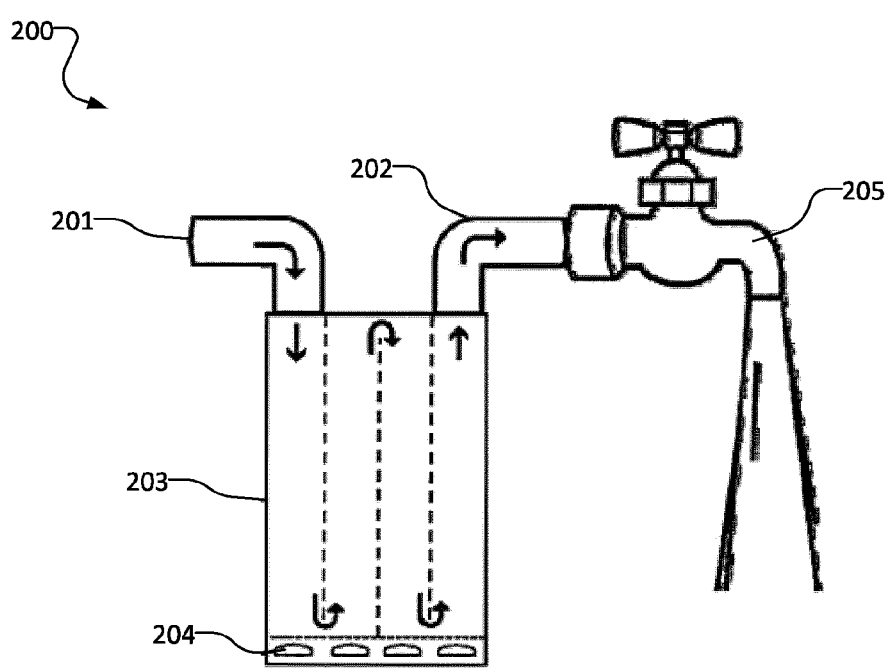
FIG. 19 is a partially-diagrammatic perspective view of an example embodiment of a UV-LED reactor as applied to water treatment.

FIG. 19 shows a water treatment system 200, comprising an inlet pipe 201, an outlet pipe 202, and a water tap 205, and incorporating a UV-LED reactor 203 operated with UV-LEDs 204 for the treatment of water. The water enters the reactor 203 via inlet 201, passes through the UV-LED reactor 203, and is irradiated by UV radiation emitted from the UV-LEDs 204, prior to exiting from outlet pipe 202 and going to the tap 205 for general use. The general fluid flow directions are shown by the arrows.

In some embodiments, the UV-LED reactor may be incorporated in appliances that dispense or use water (or water-based fluids) for human consumption. such as freezers, water coolers, coffee makers, vending machines, and the like. The water used for human consumption needs a high degree of purification. The main water supply for refrigerators, freezers, and water coolers, for example, may contain harmful pathogens. This is of particular concern in developing countries and remote areas where water may not be treated properly before distribution in the water network. In addition, due to its particular structure, a refrigerator/freezer waterline may be prone to biofilm and microbial contamination. Polymeric tubing typically transfers water from the main water supply to refrigerators to be used in through-the-door ice and drinking water. Bacterial biofilm can form in the waterline, in particular when the water is not in use (e.g., biofilm can form within 8 hours). Intermittent patterns of water use lead to stagnation of the entire water column within the waterlines for extended periods during the day. The susceptibility of water supply tubes to colonization of bacteria on surfaces and formation of biofilm is a well-recognized problem.

The UV-LEDs of the reactor may be turned on and off automatically in response to the water starting and stopping flowing. Sensors may be used to detect the flow of fluid and send a signal to the reactor to turn the UV-LEDs on or off. The UV-LED reactor may reduce the microbial contamination in the water leaving the waterline (for consumption) and reduce the risk for infection. This is facilitated by the operating conditions of UV-LEDs. For example, a UV-LED can operate at a range of temperatures and can be turned on and off with high frequency, which is particularly important for refrigerator and water cooler applications.

Figure 20:
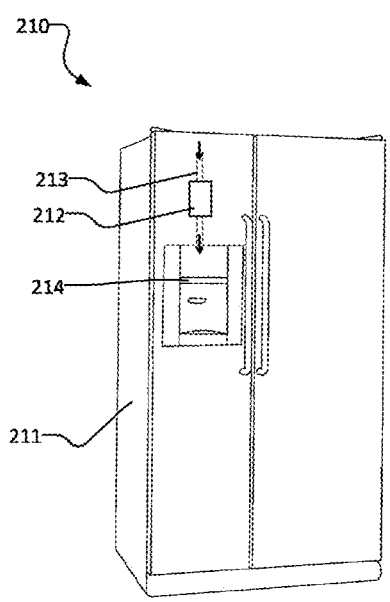
FIG. 20 is a partially-diagrammatic perspective view of a refrigerator incorporating a UV-LED reactor according to an example embodiment.

Any appliances which dispense or use water or water-based fluids (e.g. coffee or other beverages) intended for human consumption may incorporate a UV-LED reactor according to the embodiments described herein to treat the water. For example, FIG. 20 shows a refrigerator 210 comprising a body 211 and a pipe 213 for delivering water to a water/ice dispenser 214. Refrigerator 210 incorporates a UV-LED reactor 212. The water flowing in the pipe 213 passes through the UV-LED reactor 212 where it is irradiated by UV radiation prior to entering the water/ice dispenser 214. The general fluid flow directions are shown by the arrows. Similarly, other appliances which may benefit from incorporating a UV-LED reactor include, without limitation, freezers, ice machines, frozen beverage machines, water coolers, coffee makers, vending machines and the like.

Other applications of the UV-LED reactor according to the embodiments described herein include the treatment of water or other fluids used in or by healthcare or dental-related or medical devices or facilities, either for operation, cleaning or another purpose which requires clean water. In particular, many healthcare applications require water quality to be of a higher standard than drinking water. The efficiency and compactness of the UV-LED reactors described herein may make them more attractive than conventional UV-lamp reactors for implementation in healthcare devices.

Figure 21:
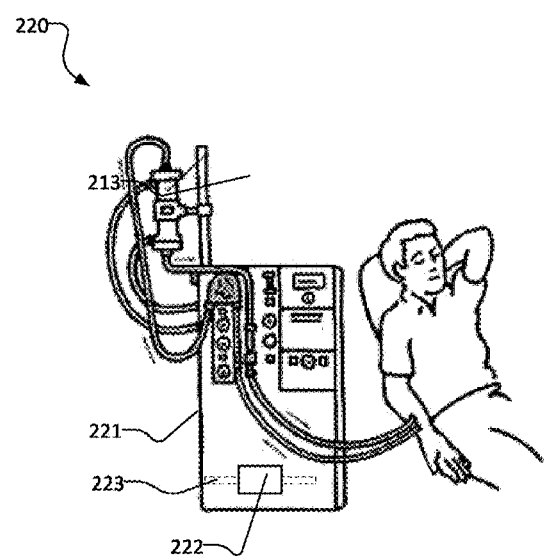
FIG. 21 is a partially-diagrammatic perspective view of a hemodialysis machine incorporating a UV-LED reactor according to an example embodiment.

For example, FIG. 21 shows a hemodialysis machine comprising a body 221 and a pipe 223 containing a UV-LED reactor 222. The water flowing in the pipe 223 passes through the UV-LED reactor 222 for treatment prior to use in the hemodialysis machine. Similarly, other appliances which may benefit from incorporating the UV-LED reactor include, without limitation, colon hydrotherapy equipment, and dental equipment which dispenses water for cleaning or operation, or the like With respect to applications in dental equipment, surveys of dental unit waterlines (DUWLs) indicate that biofilm formation is a problem and a great majority of bacteria that have been identified in DUWL are ubiquitous. Although such bacteria may be present in only low numbers in domestic water distribution systems, they can flourish as biofilms on the lumen surfaces of narrow-bore waterlines in dental units. Microorganisms from contaminated DUWL are transmitted with aerosol and splatter, generated by working unit hand-pieces. Various studies emphasize the need for reducing the microbial contamination in DUWL.

In some embodiments, a UV-LED reactor may be incorporated in a dental unit to treat the water used in the unit. The UV-LED reactor may be integrated in the dental units (such as a dental chairs) or the UV-LED reactor may be placed within the tray of the dental chair (assistant tray) holding the water spry, or within the water spray handle, or somewhere else through the waterline, for the treatment of the water prior to use. Features including instant on and off may be included in the UV-LED reactor integrated in a dental unit.

Velocity-fluence rate matching may be achieved in the reactors of any of the embodiments of FIGS. 19-21 using any of the techniques described herein.

The body or housing for embodiments of the UV-LED reactor described herein may be made of aluminum, stainless steel, or of any other sufficiently rigid and strong material such as metal, alloy, high-strength plastic, and the like. In some embodiments, for example, a single channel reactor similar to a pipe, it may also be made of flexible material such as UV-resistance PVC and the like. Also, the various components of the UV-LED reactor may be made of different materials. Further, photocatalyst structures may be used in the reactors, for UV-activated photocatalytic reactions. The photocatalyst may be incorporated in the reactor either by being immobilized on porous substrate, where fluid passes through, and/or by being immobilized on a solid substrate, where fluid passes over. Static mixers or other forms of flow modifiers may be applied to alter the reactor hydrodynamics. Further, a combination of different design concepts may be used. For example, static mixers may be used with photocatalysts.

While the embodiments described herein are presented with particular features and fluid flow channel configurations or lens configurations and the like, it is to be understood that any other suitable combination of the features or configurations described herein may be present in a UV-LED reactor.

Further, the UV-LED reactor may incorporate UV-LEDs of different peak wavelengths to cause synergistic effects to enhance the photoreaction efficiency.

The flow channels and UV-LED arrays of various embodiments can be arranged in a way that the flow is exposed to the desired number of LEDs. The design may be a single flow channel, a series of parallel flow channels, or a stack of multiple flow channels. The total UV dose delivered to a fluid may be controlled by adjusting the flow rate and/or regulating UV-LED power, and/or turning on/off the number of UV-LEDs. This design enables the manufacture of thin planar UV-LED reactors. For example, in some embodiments the UV-LED reactor may be approximately the size of a smart phone, in terms of geometry and dimensions, with inlet and outlet ports for a fluid.

The internal wall of the channels may be made of or be coated with material with high UV reflectivity for facilitating radiation transfer to the fluid and for helping to achieve the velocity-fluence rate matching described herein. Suitable reflective materials may include, by way of example, aluminum, Polytetrafluoroethylene (PTFE), quartz and/or the like. Two adjacent fluid flow channels may be connected at one end, for the fluid to go from one channel to another channel (fluid experiences multi-pass through the reactor). Different lenses including collimating, diverging, converging, and other lenses may be installed in the UV-LED reactor to adjust the UV-LED radiation pattern. The lenses may be configured to provide velocity—fluence rate matching, as described elsewhere herein.

In some embodiments portions of the reactor, where there is little or no radiation fluence rate may be blocked (e.g. filled) so that the fluid does not flow in these regions. This (effectively shaping the fluid flow channels) may help to prevent part of the fluid to receive low dose as a result of spending portions of its residence time in such regions. For example, this may be done in the embodiment of FIG. 2C for the regions where there is no (or little) fluence rate.

Many of the embodiments described herein refer to a cross-section of the bore of a fluid flow conduit or a portion thereof. In some embodiments, unless the context dictates otherwise, references to a cross-section of the bore of a fluid flow channel or to a portion of such a cross-section should be understood to mean a portion of the cross-section that incorporates more than 50% of the surface area of the total cross-section of the bore of the fluid flow channel. In some embodiments, unless the context dictates otherwise, references to a cross-section of the bore of a fluid flow channel or to a portion of such a cross-section should be understood to mean a portion of the cross-section that incorporates more than 75% of the surface area of the total cross-section of the bore of the fluid flow channel. In some embodiments, unless the context dictates otherwise, references to a cross-section of the bore of a fluid flow channel or to a portion of such a cross-section should be understood to mean a portion of the cross-section that incorporates more than 85% of the surface area of the total cross-section of the bore of the fluid flow channel. In some embodiments, unless the context dictates otherwise, references to a cross-section of the bore of a fluid flow channel or to a portion of such a cross-section should be understood to mean a portion of the cross-section that incorporates more than 95% of the surface area of the total cross-section of the bore of the fluid flow channel.

Many of the embodiments described herein comprise focusing elements which are configured (e.g. by suitable lens selection, lens shape, lens position and/or index of refraction of particular lens(es) to focus radiation from one or more UV-LEDs such that the radiation fluence rate profile across a cross-section of a bore of a longitudinally extending flow channel is generally proportional to the cross-sectional velocity profile of the longitudinally flowing fluid across the cross-section of the bore of the flow channel (or the portion thereof), when averaged over the length of the longitudinally extending flow channel. In some such embodiments, the phrase "generally proportional to" may mean that the radiation fluence rate profile across the cross-section of the bore of the flow channel is proportional to the cross-sectional velocity profile of the longitudinally flowing fluid across the cross-section of the bore of the flow channel (or the portion thereof) with a constant of proportionality that varies by less than 50% over the cross-section (or the portion thereof), when averaged over the length of the longitudinally extending flow channel. In some embodiments, this constant of proportionality varies by less than 25% over the cross-section (or the portion thereof), when averaged over the length of the longitudinally extending flow channel. In some embodiments, this constant of proportionality varies by less than 15% over the cross-section (or the portion thereof), when averaged over the length of the longitudinally extending flow channel. In some embodiments, this constant of proportionality varies by less than 10% over the cross-section (or the portion thereof), when averaged over the length of the longitudinally extending flow channel.

While a number of exemplary aspects and embodiments have been discussed above, those of skill in the art will recognize certain modifications, permutations, additions and sub-combinations thereof. It is therefore intended that the scope of the following appended claims and claims hereafter introduced should not be limited by the embodiments set forth in the examples, but should be given the broadest interpretation consistent with the description as a whole.

What is claimed is:

1. An ultraviolet (UV) reactor comprising:
   a fluid conduit comprising a fluid inlet, a fluid outlet, and
      a fluid flow channel located between the inlet and the outlet, the fluid flow channel extending in a longitudinal direction for permitting a flow of a fluid in the longitudinal direction therethrough;
   a solid-state UV emitter configured to emit a radiation along a radiation path from an emission region of the solid-state UV emitter; and
   one or more lenses positioned in the radiation path to direct at least some of the radiation into the fluid flow channel,
   wherein the one or more lenses have a focal length distance and are positioned apart from the emission region of the solid-state UV emitter by a distance different from the focal length distance such that at least some radiation emitted from the emission region of the solid-state UV emitter is refracted by the one or more lenses into the fluid flow channel.

2. The UV reactor of claim 1, wherein the emission region is spaced apart from the one or more lenses in the longitudinal direction of the fluid flow channel, and the emission region and the one or more lenses are on a common longitudinal axis of the fluid flow channel.

3. The UV reactor of claim 1, wherein the one or more lenses are adjustable to modify the average radiation fluence rate profile.

4. The UV reactor of claim 1, wherein the emission region of the solid-state UV emitter and the one or more lenses are positioned such that the radiation emitted from the emission region of the solid-state UV emitter and refracted by the one or more lenses into the fluid flow channel is positively correlated, over a portion of a cross-section of the fluid flow channel, with an elliptic paraboloid shape in the fluid flow channel.

5. The UV reactor of claim 1, wherein the emission region of the solid-state UV emitter and the one or more lenses are positioned such that a first average, over the longitudinal dimension of the fluid flow channel, radiation fluence rate profile of the radiation at cross-sectional locations relatively proximate to a cross-sectional center of the fluid flow channel is greater than a second average, over the longitudinal dimension of the fluid flow channel, radiation fluence rate profile of the radiation at cross-sectional locations relatively distant from the cross-sectional center of the fluid flow channel.

6. The UV reactor of claim 1, wherein the solid-state UV emitter comprises one or more of:
at least one UV light-emitting diode (UV-LED); or
at least one thin dielectric film.

7. The UV reactor of claim 1, wherein the one or more lenses comprise one or more of: a converging lens, a diverging lens, or a collimating lens.

8. The UV reactor of claim 1, wherein:
the UV reactor comprises a plurality of solid-state UV emitters; and
the one or more lenses comprise a lens corresponding to each one of the plurality of solid-state UV emitters and positioned to direct at least some of the radiation emitted from an emission region of the corresponding one of the plurality of solid-state UV emitters into the fluid flow channel.

9. The UV reactor of claim 1, wherein:
the UV reactor comprises a plurality of solid-state UV emitters configured to emit the radiation along the radiation path from an emission region of each one of the plurality of solid-state UV emitters; and
the one or more lenses comprise at least one shared lens positioned relative to the emission regions of the plurality of solid-state UV emitters to direct at least some of a sum of the radiation into the fluid flow channel.

10. The UV reactor of claim 1, comprising one or more flow-restraining elements located in the fluid flow channel to modify a velocity of the fluid flowing in the fluid flow channel.

11. The UV reactor of claim 10, wherein the one or more flow-restraining elements include one or more of: a static mixer, a vortex generator, a baffle, an adjustable element, a perforated material, or a porous material.

12. The UV reactor of claim 10, wherein the one or more flow-restraining elements include a nozzle element configured to provide a non-uniform fluid velocity profile at a center of the cross-section of the fluid channel.

13. The UV reactor of claim 1, wherein the solid-state UV emitter comprises:
a first solid-state UV emitter configured to emit a first radiation along a first radiation path from a first emission region of the first emitter; and
a second solid-state UV emitter configured to emit a second radiation along a second radiation path from a second emission region of the second emitter.

14. The UV reactor of claim 13, wherein the first radiation and the second radiation include different wavelengths.

15. The UV reactor of claim 1, wherein the one or more lenses are integrally packaged with the solid-state UV emitter.

16. The UV reactor of claim 1, configured such that a central axis of the radiation path is parallel to the longitudinal direction.

17. The UV reactor of claim 1, wherein the emission region of the solid-state UV emitter and the one or more lenses are positioned such that an average, over a longitudinal dimension of the flow channel, radiation fluence rate profile of the at least some radiation emitted from the emission region of the solid-state UV emitter is refracted by the one or more lenses into the fluid flow channel has maximum radiation fluence rates at a central area of a cross-section of the fluid flow channel.

18. The UV reactor of claim 1, wherein an internal wall of the fluid flow channel comprises or is coated with a material and when the solid-state UV emitter is emitting the radiation, reflection of the radiation from the internal wall contributes to the average radiation fluence rate profile.

19. The UV reactor of claim 1, wherein the one or more lenses comprise a converging lens.

20. The UV reactor of claim 1, wherein the one or more lenses are positioned apart from the emission region of the solid-state UV emitter by a distance less than the focal length distance.

21. The UV reactor of claim 1, wherein the one or more lenses are positioned apart from the emission region of the solid-state UV emitter by a distance greater than the focal length distance.

22. The UV reactor of claim 1, wherein the one or more lenses comprise:
a first converging lens; and
a second converging lens.

23. The UV reactor of claim 22, wherein the first converging lens is integrated into a device comprising the solid-state UV.

24. The UV reactor of claim 23, wherein the second converging lens is spaced apart from the device.

25. The UV reactor of claim 1, wherein the emission region and the one or more lenses are centered on a central longitudinal axis of the fluid flow channel.

26. The UV reactor of claim 1, wherein the emission region of the solid-state UV emitter and the one or more lenses are positioned such that the radiation emitted from the emission region of the solid-state UV emitter and refracted by the one or more lenses into the fluid flow channel is directed along the longitudinal direction in the fluid flow channel.

27. The UV reactor of claim 26, wherein the emission region of the solid-state UV emitter and the one or more lenses are positioned such that the radiation emitted from the emission region of the solid-state UV emitter and refracted by the one or more lenses into the fluid flow channel diverges as the radiation propagates along the longitudinal direction in the fluid flow channel.

28. The UV reactor of claim 27, wherein the emission region of the solid-state UV emitter and the one or more lenses are positioned such that the radiation emitted from the emission region of the solid-state UV emitter and refracted by the one or more lenses into the fluid flow channel diverges from a beam width less than a width of the fluid flow channel as the radiation propagates along the longitudinal direction in the fluid flow channel.

29. The UV reactor of claim 26, wherein the emission region of the solid-state UV emitter and the one or more lenses are positioned such that the radiation emitted from the emission region of the solid-state UV emitter and refracted by the one or more lenses into the fluid flow channel converges as the radiation propagates along the longitudinal direction in the fluid flow channel.

30. The UV reactor of claim 26, wherein the one or more lenses comprise a converging lens.

31. The UV reactor of claim 4, wherein the portion of the cross-section comprises more than 70% of the surface area of a total cross-section of the fluid flow channel.

32. The UV reactor of claim 4, wherein the elliptic paraboloid comprises an axis aligned with a central axis of the radiation path and a central axis of the fluid flow channel.

33. A method of using the UV reactor of claim 1, the method comprising:
   causing the flow of fluid to flow through the fluid conduit in the longitudinal direction; and
   causing the radiation emitted by the solid-state UV emitter to pass through the one or more lenses and into the fluid flow channel.

\* \* \* \* \*